(12) United States Patent
Le et al.

(10) Patent No.: US 9,262,481 B1
(45) Date of Patent: Feb. 16, 2016

(54) DETERMINING POPULAR VENUES

(71) Applicant: MicroStrategy Incorporated, Vienna, VA (US)

(72) Inventors: Thuy Le, Vienna, VA (US); Loic Fabro, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 171 days.

(21) Appl. No.: 14/034,833

(22) Filed: Sep. 24, 2013

(51) Int. Cl.
*G06F 17/30* (2006.01)

(52) U.S. Cl.
CPC ...... *G06F 17/3053* (2013.01); *G06F 17/30867* (2013.01); *G06F 17/30876* (2013.01)

(58) Field of Classification Search
None
See application file for complete search history.

(56) References Cited

U.S. PATENT DOCUMENTS

| | | | |
|---|---|---|---|
| 8,326,327 B2 | 12/2012 | Hymel et al. | |
| 8,918,463 B2 * | 12/2014 | Garcia et al. | 709/204 |
| 2013/0073422 A1 * | 3/2013 | Moore et al. | 705/26.7 |

* cited by examiner

*Primary Examiner* — Hung Q Pham
(74) *Attorney, Agent, or Firm* — Fish & Richardson P.C.

(57) ABSTRACT

A computer-implemented method includes receiving a request for information indicative of venues that are located within a geographic region of interest, accessing user data for one or more users of a social networking platform, identifying, in the accessed user data, data indicative of one or more affirmative actions that are performed for the particular venue by at least one of the one or more users, and generating a popularity score for the particular venue, determining one or more popular venues, with a popular venue being associated with an increased popularity score relative to popularity scores of other of the multiple venues located with the geographic region of interest, and for a determined popular venue, generating data indicative of a type of user of the social networking platform who performs one or more affirmative actions for the determined popular venue.

17 Claims, 6 Drawing Sheets

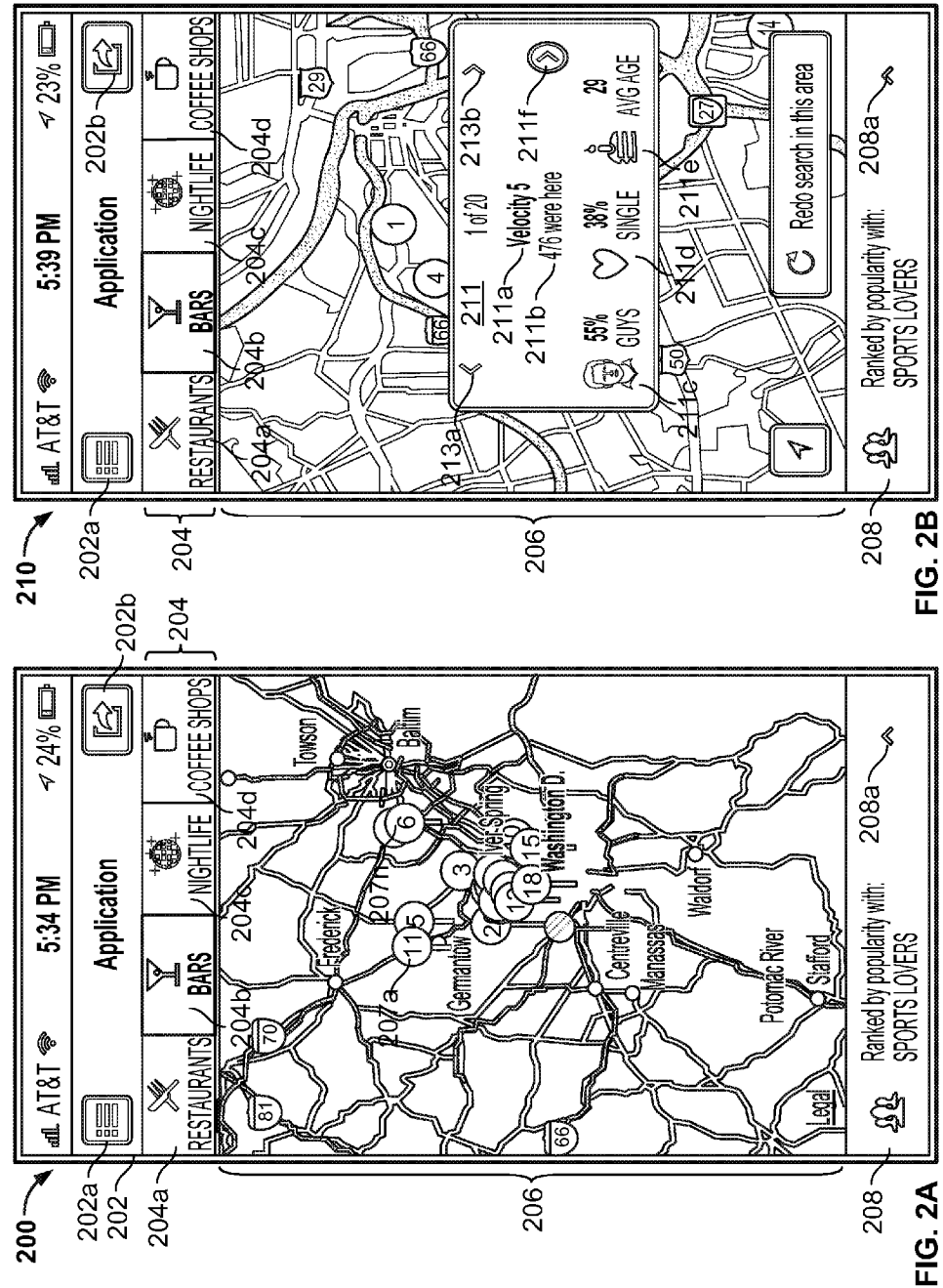

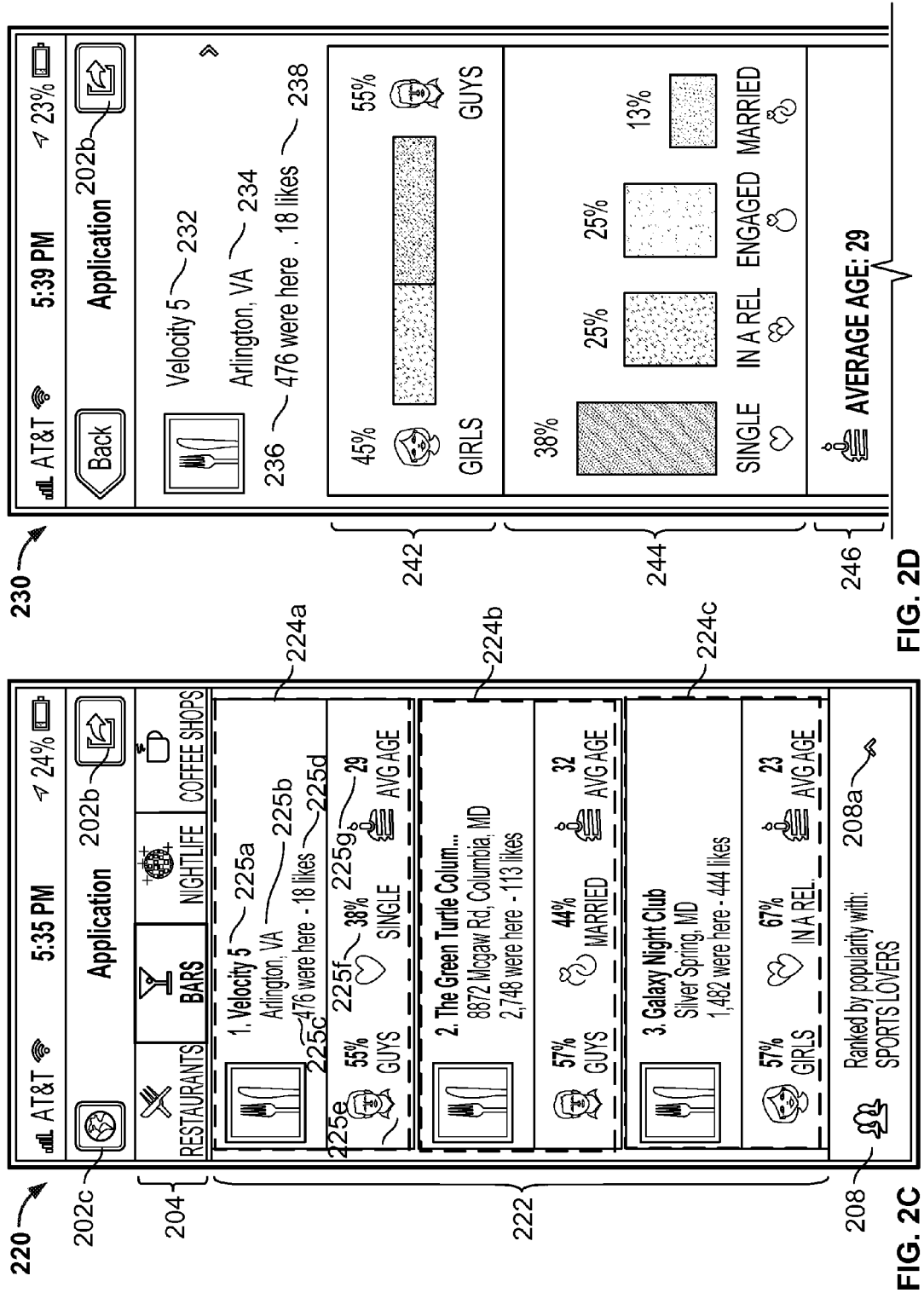

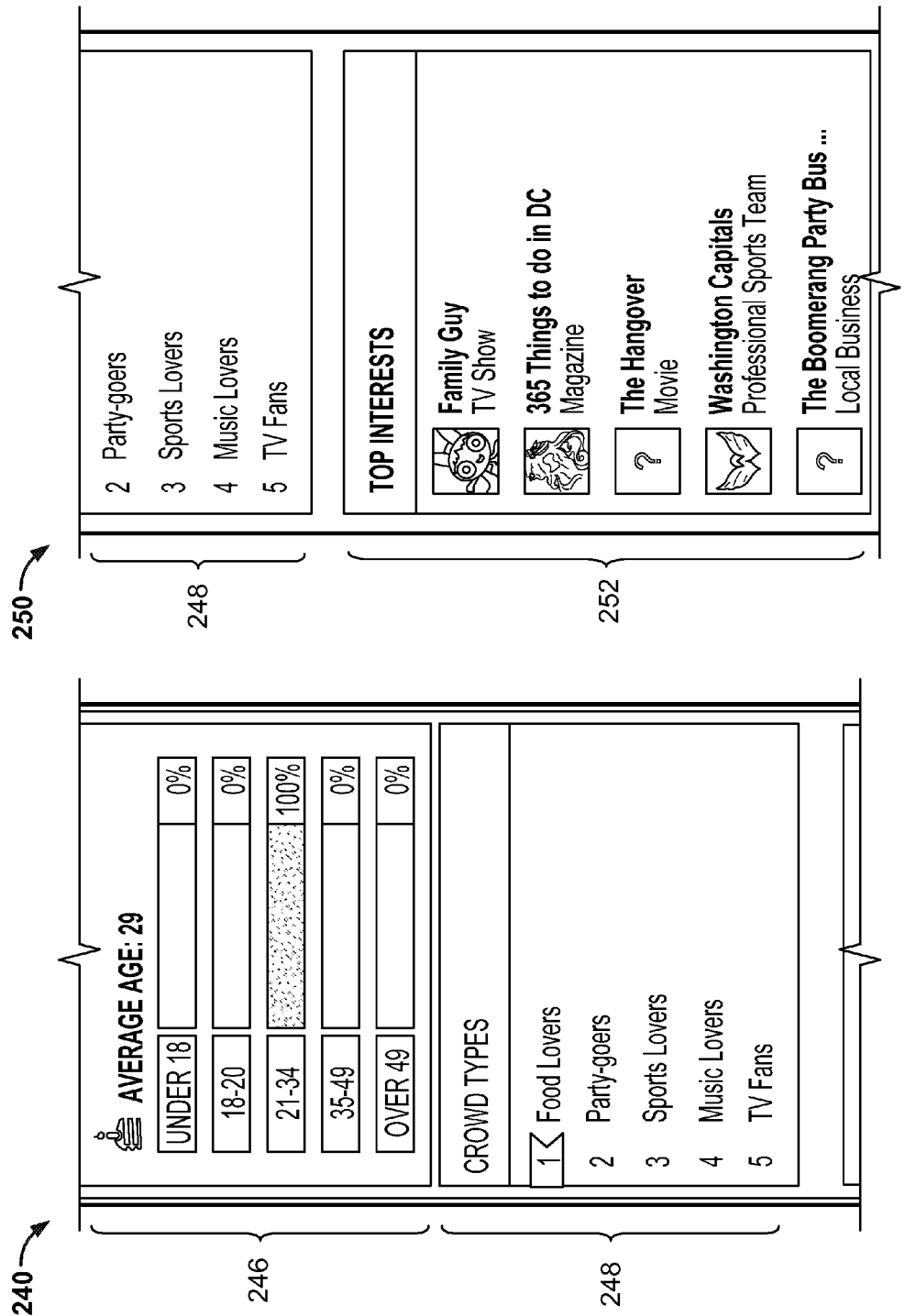

DETERMINING POPULAR VENUES

BACKGROUND

Social networking platforms may store data about or otherwise related to users of the social networking platforms. These social networking platforms often allow users of the platforms to share information with one another and perform various actions. The volume of data generated that corresponds to the actions of others and the sharing of information with other users of such social networking platforms may be relatively large. Consequently, an individual user of a social networking platform may have difficulty managing this large amount of available data. As a result, the user may miss, gloss over, or otherwise fail to appreciate information of some level of significance that was shared with or otherwise available to the user within the social networking platform.

SUMMARY

One aspect of the subject matter described in this specification can be embodied in a computer-implemented method that include the actions of receiving a request for information indicative of venues that are located within a geographic region of interest, accessing user data for one or more users of a social networking platform, with the accessed user data being associated with venues located within the geographic region of interest, for each particular venue among multiple venues located within the geographic region of interest, identifying, in the accessed user data, data indicative of one or more affirmative actions that are performed for the particular venue by at least one of the one or more users, and generating, based on the data indicative of the one or more affirmative actions associated with the particular venue, a popularity score for the particular venue, with the popularity score being indicative of an affinity of the one or more users for the particular venue, determining, based on the popularity scores for the multiple venues located within the geographic region of interest, one or more popular venues, with a popular venue being associated with an increased popularity score relative to popularity scores of other of the multiple venues located with the geographic region of interest, and for a determined popular venue, generating data indicative of a type of user of the social networking platform who performs one or more affirmative actions for the determined popular venue.

In some implementations, the method further includes analyzing data indicative of characteristics of users of the social networking platform who perform the one or more affirmative actions for the determined popular business, wherein generating the data indicative of the type of user includes the actions of generating, based on analyzing, the data indicative of the type of user of the social networking platform who performs the one or more affirmative actions for the determined popular venue. The data can be indicative of the type of user comprises one or more of anonymous demographic data about one or more users of the social networking platform who perform the one or more affirmative actions for the determined popular venue and anonymous psychographic data about the one or more users of the social networking platform who perform the one or more affirmative actions for the determined popular venue. The anonymous demographic data can include one or more of data indicative of a gender of the one or more users of the social networking platform who perform the one or more affirmative actions for the determined popular venue, data indicative of an age of the one or more users of the social networking platform who perform the one or more affirmative actions for the determined popular venue, data indicative of an ethnicity of the one or more users of the social networking platform who perform the one or more affirmative actions for the determined popular venue, data indicative of knowledge of languages of the one or more users of the social networking platform who perform the one or more affirmative actions for the determined popular venue, data indicative of home ownership of the one or more users of the social networking platform who perform the one or more affirmative actions for the determined popular venue, data indicative of an employment status of the one or more users of the social networking platform who perform the one or more affirmative actions for the determined popular venue, and data indicative of a relationship status of the one or more users of the social networking platform who perform the one or more affirmative actions for the determined popular venue and the anonymous psychographic data can include one or more of data indicative of one or more interests of the one or more users of the social networking platform who perform the one or more affirmative actions for the determined popular venue and data indicative of a lifestyle of the one or more users of the social networking platform who perform the one or more affirmative actions for the determined popular venue. The accessed user data can includes demographic data and psychographic data for a particular user on the social networking platform, and demographic data and psychographic data for one or more other users of the social networking platform, with the one or more other users having one or more social connections to the particular user in the social networking platform. The actions can further include determining one or more privacy settings that have been set by the particular user and determining one or more privacy settings that have been set by respective ones of the one or more other users, wherein the accessed user data is based on the one or more privacy settings for the particular user and the privacy settings for the respective ones of the one or more other users. In some examples, an affirmative action can include one or more of an action of endorsing content available on the social networking platform, an action of checking into a location, wherein an entity associated with the location also has content on the social networking platform that corresponds to the location, an action of posting content on the social networking platform, and an action of adding a tag to content posted on the social networking platform. The actions can further include receiving a selection of a filtering criteria and filtering the one or more popular venues based on the received filtering criteria. The filtering criteria can correspond to a type of location and for a particular venue among the multiple venues located within the geographic region of interest, determining when the particular venue satisfies the filtering criteria, identifying, in the accessed user data and based on determining when the particular venue satisfies the filtering criteria, data indicative of one or more affirmative actions that are performed for the particular venue by at least one of the one or more users, and generating, based on the data indicative of the one or more affirmative actions associated with the particular venue, a popularity score for the particular venue, with the popularity score being indicative of an affinity of the one or more users for the particular venue. The filtering criteria can correspond to one of a predefined crowd type and generating the data indicative of the type of user further includes determining when a type of user satisfies the filtering criteria, and generating data indicative of a type of user of the social networking platform who satisfies the filtering criteria and who performs one or more affirmative actions for the determined popular venue. The actions can further include receiving a selection of information indicative of one or more demographic and psychographic criteria, generating a custom crowd type from the received criteria, and using the generated custom crowd type as the received filtering criteria. The actions can further include transmitting, to a client device, information indicative of a geographic area that includes representations of the one or more popular venues, receiving information indicative of a selection of at least one of the representations included in the geographic area, and transmitting, to the client device, anonymous demographic data and anonymous psychographic data about one or more users who performed affirmative actions with a venue represented by the selected at least one of the representations. The actions can further include receiving information indicative of one or more user attributes that define a particular crowd type and determining a portion of the accessed user data that is associated with users of the social networking platform who possess attributes corresponding to at least one of the one or more user attributes that define the particular crowd type, wherein generating the popularity score can include generating, based on the determined portion of the accessed user data that is associated with users of the social networking platform who possess attributes corresponding to at least one of the one or user attributes that define the particular crowd type, a popularity score that is indicative of an affinity of the particular venue with the particular crowd type relative to an affinity of the particular venue with users of the social networking platform.

Another aspect of the subject matter described in this specification can be embodied in a system that includes one or more processing devices and one or more machine-readable media configured to store instructions that are executable by the one or more processing devices to perform operations that include receiving a request for information indicative of venues that are located within a geographic region of interest, accessing user data for one or more users of a social networking platform, with the accessed user data being associated with venues located within the geographic region of interest, for each particular venue among multiple venues located within the geographic region of interest, identifying, in the accessed user data, data indicative of one or more affirmative actions that are performed for the particular venue by at least one of the one or more users, and generating, based on the data indicative of the one or more affirmative actions associated with the particular venue, a popularity score for the particular venue, with the popularity score being indicative of an affinity of the one or more users for the particular venue, determining, based on the popularity scores for the multiple venues located within the geographic region of interest, one or more popular venues, with a popular venue being associated with an increased popularity score relative to popularity scores of other of the multiple venues located with the geographic region of interest, and for a determined popular venue, generating data indicative of a type of user of the social networking platform who performs one or more affirmative actions for the determined popular venue.

In some implementations, the data indicative of the type of user can include one or more of anonymous demographic data about one or more users of the social networking platform who perform the one or more affirmative actions for the determined popular venue and anonymous psychographic data about the one or more users of the social networking platform who perform the one or more affirmative actions for the determined popular venue. The operations can further include receiving a selection of a filtering criteria and filtering the one or more popular venues based on the received filtering criteria. The filtering criteria can correspond to a type of location and for each particular venue among multiple venues located within the geographic region of interest, determining when the particular venue satisfies the filtering criteria, identifying, in the accessed user data and based on determining when the particular venue satisfies the filtering criteria, data indicative of one or more affirmative actions that are performed for the particular venue by at least one of the one or more users; and generating, based on the data indicative of the one or more affirmative actions associated with the particular venue, a popularity score for the particular venue, with the popularity score being indicative of an affinity of the one or more users for the particular venue. The filtering criteria can correspond to one of a predefined crowd type and generating data indicative of a type of user further includes determining when a type of user satisfies the filtering criteria and generating data indicative of a type of user of the social networking platform that satisfies the filtering criteria and who performs one or more affirmative actions for the determined popular venue. The operations can further include receiving a selection of information indicative of one or more demographic and psychographic criteria, generating a custom crowd type from the received criteria, and using the generated custom crowd type as the received filtering criteria.

Yet another aspect of the subject matter described in this specification can be embodied in a computer-implemented method including receiving an indication of a crowd type, receiving a request for information indicative of venues that are located within a geographic region of interest, accessing user data for one or more users of a social networking platform, with the accessed user data being associated with the venues located within the geographic region of interest, for a particular venue located within the geographic region of interest, determining, based on the accessed user data, a number of check-ins that are performed at the particular venue by one or more users that belong to the indicated crowd type, and generating, based on the number of check-ins at the particular venue, a popularity score for the particular venue, identifying, based on popularity scores for the venues located within the geographic region of interest, popular venues for the indicated crowd type, with a popular venue being associated with an increased popularity score relative to popularity scores of other of the venues located with the geographic region of interest, and transmitting, to a device that sent the request, aggregated data indicative of types of users of the social networking platform who check-into the popular venues.

Particular embodiments of the subject matter described in this specification may be implemented to realize none or one or more of the following features. Popular venues located in a geographic region of interest can be identified. These popular venues may also have associated demographic data and psychographic data about the types of people that frequent these particular locations. The demographic data and the psychographic data may be presented at various levels of granularity allowing a user to get an initial sense of the type of people that frequent a venue, but also allowing a user to obtain additional demographic data or psychographic data about the types of people that frequent a venue if the user so desires. Users can also make more informed decisions about whether to visit a particular venue based at least in part on the demographic data, the psychographic data, and/or the calculated popularity for a particular venue.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 2A-2G illustrate examples of graphical user interfaces for an example of an application the presents data indicative of a type of user that frequents one or more of the venues.

DETAILED DESCRIPTION

Figure 1:
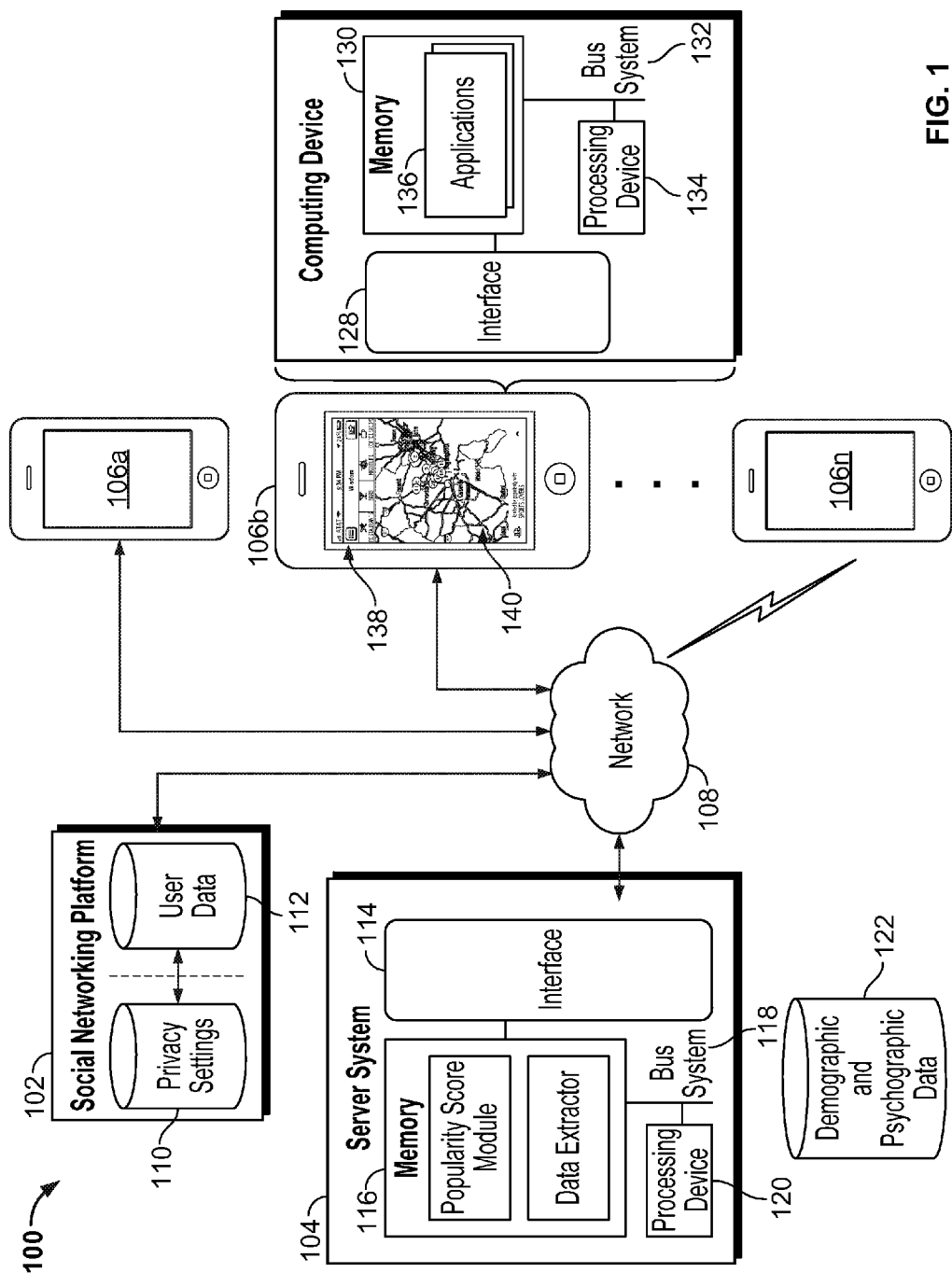
FIG. 1 illustrates examples of a system that can be used to provide information to a user about one or more venues.

A system consistent with this disclosure presents information to one or more users of an application about one or more venues in proximity to a geographic region of interest. In a particular example, the geographic region of interest is near a particular user's location (e.g., based on geo-locating the particular user's mobile device that is executing the application). In general, the presented information can be provided in such a way that the particular user of the application can identify whether any of the popular venues are likely to be of interest to the particular user. In general, the information can include data indicative of types of users that frequent particular ones of the one or more venues or indicative of the type of venue to help a particular user decide whether the location is a place that the particular user would like to visit. In an example, a particular venue may be popular with single women. As another example, a particular venue may be popular with people that are sports lovers. As yet another example, a particular venue may be popular with people that are food lovers. As a result, users that may associate themselves with one or more types of users may be more likely to frequent a venue that is frequented by like-minded people or any other people that the user may want to meet. In other words, the presented information allows a user to locate a venue based at least on part on a combination of one or more characteristics of people that frequent a particular venue or characteristics about the particular venue.

In an example, the system can generate the data indicative of a type of user that frequents particular ones of the one or more venues by accessing user data (e.g., one or more user profiles) associated with user identities (e.g., users who have registered with a social networking platform or who have been assigned a unique or otherwise identifying identifier by the social networking platform) that are maintained by a social networking platform. In a particular example, demographic data and psychographic data can be generated from the accessed user data. The demographic data and psychographic data for one or more users that frequent a particular venue can be associated with that particular venue. Then, for example, in response to a request for information, the demographic data and psychographic data associated with the particular venue can be presented to the particular user on the application executing on the mobile device. To help the user of the application more easily identify a possible venue of interest, the application can filter the venues based on different types of venues (e.g., bars, nightlife, restaurants, coffee shops, and other venues) or types of crowds that frequents the venues (e.g., movie lovers, sports lovers, single men, single women, combinations of these, and other types of crowds), or both, e.g., in response to receiving a selection of a filtering criteria provided by the particular user.

In this example, the venues can also be presented or otherwise arranged in a graphical user interface of the application based on a popularity of each of the venues relative to other venues within the geographic region of interest. That is, in general, a predefined number of venues may be displayed based on a determined popularity relative to the other venues. In a particular example, only the twenty most popular venues are presented to the user and other venues deemed to be less popular than the twentieth venue are not shown.

In an example, the popularity of each venue can be determined by identifying, in the accessed user data, data indicative of one or more affirmative actions performed on the social networking platform that are associated with the particular venue. In general, an affirmative action is any action that a user takes or is associated with that indicates an interaction with a particular venue. For example, if a user of the social networking platform "likes" or otherwise takes an action to endorse content associated with a venue available on the social networking platform, this action can be used to gauge the popularity of the venue relative to other venues in the geographic region. As another example, a user may check into a particular venue. In this particular example, an entity associated with a venue may generate content on the social networking platform that allows users of the social networking platform to indicate whether particular users have visited the venue. When a user indicates that the user has visited the venue, that user has checked into the venue. Checking into a location is described in more detail below. In an example, a user may "dislike" a particular venue. In an example, a second user may be tagged by a first user that is associated with a particular venue. In this particular example, the second user being included in a tag associated with the particular venue may be interpreted as an affirmative action. Other actions are also possible and may affect a popularity determination of a particular venue accordingly. In this example, the system can weigh the identified affirmative actions based on one or more groups to which a particular user that performed one or more affirmative actions belongs. In some situations, a particular venue may have more than one particular location in a geographic region of interest. In a particular example, there may be many coffee shops owned and operated by the same venue within a geographic region of interest. In such situations, these separate locations may be treated as separate venues for the purposes of determining a popularity of each venue.

Referring now to FIG. 1, an example of a system 100 that can be used to provide information to a user about one or more venues is shown. In general, the system 100 allows a user of an application executing on a mobile device to search for and display information indicative of one or more popular venues in a geographic region of interest. For convenience, the system 100 is depicted as including a single social networking platform 102, although the system 100 may be configured to communicate with a plurality of social networking platforms operated by different social networking service providers. In general, the information indicative of popular venues can also be presented with data indicative of a type of person that frequents particular ones of the one or more popular venues. As a result of being shown this information, the user may be better informed with respect to which venues may be of interest to the user.

The system 100 includes a social networking platform 102, a server system 104, and one or more computing devices 106*a*-106*n*. The server system 104, the social networking platform 102 and the one or more mobile computing devices 106*a*-106*n* may electronically communicate with each other using a network 108. As will be described in more detail below, one or more electronic communications from the one or more computing devices 106*a*-106*n* can be sent to the social networking platform 102 and used by the server system 104 in determining a popularity for one or more venues.

There are many different examples of social networking platforms 102. Facebook, Twitter, LinkedIn, Google+, MySpace, Yelp, and Orkut are just a few examples. But, there are many others, and it is reasonable to expect many more may emerge in the future. The techniques described herein for handling data available within a social networking platform are widely applicable and may be applied to data available within any relevant social networking platform.

A social networking platform, such as social networking platform 102, frequently enables individual user identities to establish social connections with other user identities. The social connections formed between individual users within a social networking platform may be represented in the form of a graph, where users are represented by nodes and social connections between users are represented by edges connecting the nodes. These social connections between user identities may reflect relationships between the underlying human users who correspond to the user identities. For example, a social connection between two user identities within the social networking platform 102 may reflect a social friendship (e.g., developed through physical interaction in the real-world and/or through on-line interaction in the cyber-world) or a professional relationship between the underlying human users who correspond to the user identities.

In an example, a user identity may be able to unilaterally form a social connection with another user identity. In this example, a social networking platform, such as social networking platform 102, may enable a first user identity to form a connection to a second user identity simply by specifying a desire to form a social connection to the second user identity and without requiring approval of the connection by the second user identity. In another example, the formation of social connections between two user identities may be a bilateral process. In this example, when a first user identity specifies a desire to form a connection to a second user identity, the social networking platform may establish the connection only after the second user identity approves the formation of the connection between the first user identity and the second user identity.

A user identity of the social networking platform 102 may form a social network within the social networking platform by forming social connections to other user identities of the social networking platform. In some cases, the social network of a particular user identity of a social networking platform may be defined as the group of other user identities to whom the particular user identity is directly connected. Alternatively, in other cases, the social network of a particular user identity of a social networking platform may be defined to include a group of other user identities that are within a threshold number of degrees of separation of the particular user identity. In an example, a graph or other data structure may be maintained by the social networking platform 102 to describe the degrees of separation between a particular user identity and other user identities.

A social networking platform, such as social networking platform 102, commonly facilitates sharing of information and the exchange of electronic communications between user identities and other user identities who are part of their social networks. For example, a social networking platform may allow a particular user identity to access more detailed information about the other user identities that are part of the particular user identity's social network than the social networking platform allows the particular user identity to access about user identities that are not part of the particular user identity's social network. Additionally or alternatively, a social networking platform may provide communications conduits between a particular user identity and the other user identities who are part of the particular user identity's social network that the social networking platform does not otherwise provide between the particular user identity and other user identities who are not part of the particular user identity's social network.

In addition to enabling user identities to establish connections to other user identities, some social networking platforms enable user identities to establish connections with other types of objects. For example, some social networking platforms may enable user identities to record information about their hometowns, current places of residence, or places they have visited (including, e.g., geographic locations such as cities, states, or countries as well as local venues or places such as restaurants, retail stores, parks, train or bus stations, airports, etc.) by establishing connections to location objects within the social networking platforms. Additionally or alternatively, some social networking platforms may enable user identities to record information about events to which they have been invited, are planning to attend, and/or have attended by establishing connections to event objects within the social networking platforms.

Similarly, some social networking platforms may enable user identities to record endorsements of interests, such as, for example, local venues or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities by establishing connections to interest objects within the social networking platforms. In some such social networking platforms, interest objects may be manifested as so-called pages that are maintained by one or more representatives of the interest objects and that, among other features, provide information about the interest objects and that provide conduits for enabling interaction between the interest objects and the user identities that have formed connections to the interest objects.

In some implementations, location objects and interest objects can be different sub-types of a common object.

Furthermore, some social networking platforms may enable user identities to establish connections with independent applications that leverage the social networking platforms, for example, by granting the independent applications authorization to access or extract data from the social networking platform on their behalf.

In some social networking platforms that enable user identities to form connections with object types like location objects, event objects, and interest objects, such location objects, event objects, and/or interest objects each may be associated with one or more representatives. Furthermore, the social networking platforms may enable these representatives to interact with the user identities to which the objects are connected using the manifestation of the object within the social networking platform.

For example, an interest object within a social networking platform may be manifested as a "page" that provides information about the interest that the object represents, and the social networking platform may enable one or more designated representatives associated with the "page" to share information and exchange electronic communications with the user identities connected to the interest object in a manner in which such shared information or exchanged communications appear to involve the "page" as opposed to an individual user identity. In one particular example, the social networking platform may provide a mechanism that enables one or more representatives associated with the interest to broadcast an electronic message that is shared publicly with all (or some defined subset of all) of the user identities to which the interest object is connected.

As another example, a location object within a social networking platform also may be manifested as a "page" that provides information about the location that the object represents. The social networking platform may enable one or more designated representatives associated with the "page" to share information and to exchange electronic communications with the user identities connected to the location object in a manner in which such shared information or exchanged communications appear to involve the "page" as opposed to an individual user identity. In one particular example, the social networking platform may provide a mechanism that enables one or more representatives associated with the location to broadcast an electronic message that is shared publicly with all (or some defined subset of all) of the user identities to which the interest object is connected.

A social networking platform may maintain a user profile for a user identity that reflects the user identity's name, gender, age, relationship status, education history (e.g., schools attended and/or degrees awarded), employment history (e.g., employers and/or positions held), contact information (e.g., e-mail address(es), telephone number(s), other electronic addresses, physical addresses, etc.), current residence information (e.g., city, state/territory, and/or country), hometown information (e.g., city, state/territory, and/or country), primary language, and/or sexual orientation. Other user profile characteristics can also be maintained by the social networking platform.

Additionally or alternatively, the user identity's profile also may reflect various different interests of the user identity and/or indications of various different locations that the user identity (or another user identity, such as, for example, a member of the user identity's social network) has registered with the social networking platform as locations that the user identity has visited. Such locations may include a wide variety of different types of locations, including, for example, geographic locations, such as cities, states, or countries, as well as commercial venues, venues, or other places, such as restaurants, retail stores, parks, train or bus stations, airports, etc. For ease of reference, indications of locations registered with a social networking platform as locations that a user identity has visited may be referred to herein as "check-ins," and information stored in or in connection with a user identity's profile that reflects such indications of locations registered with the social networking platform as locations that the user identity has visited may be referred to herein as "check-in information."

In an example, a social networking platform may provide a particular user identity with certain increased functionality in connection with other user identities who are members of the particular user identity's social network within the social networking platform that the social networking platform may not provide to the particular user identity in connection with user identities who are not members of the particular user identity's social network within the social networking platform. For example, a social networking platform may provide a particular user identity with one or more different mechanisms for electronically communicating or otherwise sharing content with other user identities who are members of the particular user identity's social network within the social networking platform. Furthermore, an social networking platform may allow a particular user identity to access more detailed profile information about other user identities who are members of the particular user identity's social network within the social networking platform than the social networking platform allows the particular user identity to access about user identities who are not members of the particular user identity's social network. Additionally or alternatively, a social networking platform may enable a particular user identity to access "check-ins" registered with the social networking platform by members of the particular user identity's social network within the social networking platform, while not enabling the particular user identity to access "check-ins" registered with the social networking platform by user identities who are not members of the particular user identity's social network within the social networking platform.

As described above, the connections between individual user identities within a social networking platform may be represented in the form of a graph, where user identities are represented by nodes and connections between user identities are represented by edges connecting the nodes. As new user identities join and other user identities stop using the social networking platform and/or as new connections between user identities are formed and old connections between user identities are dissolved, this graph of interconnected user identities may change dynamically in time to represent the current state of connections between user identities within the social networking platform.

Referring again to FIG. 1, the social networking platform 102 may include a data store 110 that includes privacy settings data and a data store 112 that includes user data. The data store 110 may include one or more privacy settings that are specified by a particular user of the social networking platform 102. These privacy settings may control or otherwise suggest how the social networking platform 102 handles a request for user data about the particular user. In one example, the privacy settings may specify that no user data stored in the data store 112 be shared with third-parties. Additionally, or alternatively, the privacy settings may specify that posts or other content posted by the particular user is viewable only by a subset of the other users with whom the particular user is connected. Other privacy settings are also possible and can be stored in the data store 110. As an example, one or more privacy settings can be configured for one or more affirmative actions so that some of the affirmative actions are effectively hidden from the server system 104.

At least some of the shared information (e.g., as described above), relationships between user identities, demographic indicators about particular users corresponding to respective user identities, and psychographic information about particular users corresponding to respective user identities can be stored in the user data included in the data store 112. For example, a particular human user may like one or more movies and affirmatively reflect that particular interest by adding content to their user profile. The content added to the particular user's user profile may be included in the data store 112. As another example, when a user first registers to become a member of the social networking platform 102, the social networking platform 102 may ask a series of questions about the human user. In an example, some questions may include questions pertaining to date of birth, hometown, current residence, contact information, and other information. This information may also be associated with the particular user's user profile and stored in the data store 112.

In an example, as a particular user interacts with content on the social networking platform 102, the user data included in the data store 112 may be updated. For example, if a particular user posts a message or some other content to a user profile of another user to which the particular user is connected, the social networking platform 102 may capture that action and store the message or other content in the user data included in the data store 112 for that particular user. As another example, if the particular user endorses content associated with another user of the social networking platform 102, the social networking platform 102 may capture that action and store the endorsement in the user data included in the data store 112 for that particular user. In a particular example, users can endorse content on a social networking platform 102 by pressing, selecting, or otherwise interacting with a user interface component, such as a button displayed on a web page that presents the particular content.

In some implementations, an indication can be stored in the data store 112 as a string such as "John Doe likes Shakespeare." In addition, or alternatively, one or more data objects can be stored in the data store 112 that identify a user and an entity (or subject of the action), where an action may create a relationship (or link) between the two objects. In this example, a first data object may be a data object that identifies a user as "John Doe," and a second data object that identifies an entity as "Shakespeare." Then, if "John Doe" "endorses" the "Shakespeare" entity, a link or other relationship can be created by the social networking platform to indicate that "John Doe likes Shakespeare." As a result, the two data objects and their respective relationship can then be accessed and used to determine that the user identified as John Doe performed the action of endorsing Shakespeare. Other affirmative actions can also be captured by the social networking platform 102 including, but not limited to, checking into a location and/or adding a tag to content already posted on the social networking platform 102.

With respect to checking into a location, an entity, such as a venue, may create a page or some other content type of object that corresponds to the location on the social networking platform 102. Then, when a user of the social networking platform 102 visits the location, the user can navigate to that object and select or otherwise interact with a portion of the content to indicate that the user was at the location (e.g., "check in"). In a particular example, a button or other user interface component is provided on the object to enable a user to check into the geographic location. In some implementations, the social networking platform may detect that the user is at the particular geographic location (e.g., using GPS or other location identifying techniques). In such implementations, the social networking platform may prompt the user (e.g., using a push message or other notification) to determine whether the user would like to check in at the geographic location.

The server system 104 includes various components that enable the server system 104 to access the user data stored in the data store 112. In addition, the sever system 104 can use the information stored in the data store 112 to provide one or more different services to a user executing an application on a computing device, such as computing devices 106a-106n.

In an example, the user data that is included in the data store 112 can be used to determine popularity scores for particular venues. Generally, a popularity score may be a value indicative of an affinity of a particular set of users for the particular venue. In this context, affinity generally is a measure of how much more or less likely a particular type of user (e.g., single males) is to have connected with a particular venue than the overall population of users on the social networking platform. For example, a user may interact with the venue in a social networking platform, e.g., by "liking" the venue, by performing a "check-in" at the venue, and so forth. In such examples, any or all of the popularity scores, the demographic data, and psychographic data can be associated with the respective venues. Then the demographic data and/or psychographic data about one or more types of people that interact with the particular venue (e.g., by performing an affirmative action on the social networking platform that is directed toward the venue) can be provided to a user in response to receiving a request for information indicative of venues that are located within a geographic region of interest. In a particular example, the venues that are presented in response to receiving a request for information have increased popularity scores relative to popularity scores of other venues located within the geographic region of interest.

In an example, the server system 104 includes an input/output (I/O) interface 114, memory 116, a bus system 118, and one or more processing devices 120. The server system 104 may also be in communication with a data store 122 that includes demographic data and psychographic data. In some implementations, the demographic data is user data that has been accessed by the server system 104 from the social networking platform 102 (or from a plurality of social networking platforms). In some implementations, the psychographic data is data about users that the server system 104 has derived or otherwise inferred from the data accessed by the server system 104 from the social networking platform 102 (or from a plurality of social networking platforms). The server system 104 can communicate with any of the social networking platform 102, the one or more computing devices 106a-106n, and the network 108 through I/O interface 114. In an example, the I/O interface 114 can be any combination of hardware and software capable of receiving data over a network, including, e.g., an Ethernet interface, a wireless networking interface, a fiber-optic networking interface, a modem, and so forth.

A bus system 118, including, for example, a data bus and a motherboard, can be used to establish and to control data communication between the components of the server system 102. In an example, the server system 104 can be one or more desktop computers, one or more rack-mounted servers, and the like. In some implementations, the server system 104 may be distributed in different geographic locations or may be contained at a centralized location, such as a data center.

The one or more processing devices 120 can each include one or more microprocessors. Generally, one of the processing devices 120 can include an appropriate processor and/or logic that is capable of receiving and storing data, and of communicating over a network (e.g., network 108). Memory 116 can include a hard drive and a random access memory storage device, including, e.g., a dynamic random access memory, or other types of non-transitory machine-readable storage devices. As shown in FIG. 1, memory 116 stores computer programs or other program logic that is executable by one or more of processing devices 120. In the illustrated example, the memory 116 includes a popularity score module 124 and a data extractor 126.

The popularity score module 124 can be configured to determine a popularity score for a particular venue based at least in part on a number of affirmative actions taken by one or more users of the social networking platform 102.

The data extractor 126 can be configured to access or otherwise retrieve information from the social networking platform 102. For example, the data extractor can use an application programming interface (API) to send information requests to the social networking platform 102. In an example, the data extractor 126 may extract data periodically (e.g., on-demand, hourly, daily, weekly, and so forth) by using the API to poll the social networking platform 102. In this example, the data extractor 126 may only poll the social networking platform 102 for user data for which the server system 102 can access. This may include particular users that have provided permission for the server system 104 to access their respective user data as well as all of the other users that are socially connected to those particular users, depending on the privacy settings set by the other users.

In general, the server system 104 can gather information about the popularity of venues (as well as certain demographic indicators and psychographic data) by utilizing the social networking platform 102. For example, a particular user of the social networking platform 102 may install an application on the one or more computing devices 106a-106n that is configured to communicate with the server system 104 and to receive, from the server system 104, information indicative of popular venues near a geographic location of interest. In addition, the application may provide the user with demographic data and/or psychographic data about users who interact with those popular venues (e.g., by performing affirmative actions on the social networking platform 102). When registering the application, the particular user may be prompted to provide login credentials to the social networking platform or may be otherwise required to provide the server system 104 with permission to access the user's user data store in the user data store 112 in order to complete an installation of the application on the computing device. In general, the permission may allow the application to access the particular user's user data on the social networking platform 102. As a result, the application can retrieve the particular user's demographic data, likes, check-ins, and other data.

In addition, with the permission received from the particular user, the sever system 104 can access the user data stored in the data store 112 to determine each other user that is socially connected to the particular user. The server system 104 may also access user data stored in the data store 112 for these other users that are socially connected to the particular user, although one or more of the socially connected users may prevent the server system 104 from accessing their respective user data. For example, some of the other users that are socially connected to the particular user may have set one or more privacy settings stored in the data store 110 to prevent third-parties from accessing the respective user data for some of the other users. In this example, the privacy settings would indicate that the social networking platform 102 should block any requests for user data about those other users that are submitted by the server system 104, as the server system 104 would be considered a third-party. As a result, these privacy settings essentially prevent the server system 104 from obtaining any information about those other users who have configured their privacy settings to block user data access by third-parties.

In some examples, many users do allow third-parties to access their user data, and in the manner described above, the social connections of the various users can be used to generate a robust amount of data about many users and their respective activities on the social networking platform 102. Many of the techniques described herein utilize this data to provide information services to users of an application executing on the one or more computing devices 106a-106n. In an example, the activities may be used to generate a popularity score for one or more venues and the user data may be used to generate demographic data and psychographic data for users that frequent the one or more venues.

In an example, the one or more computing devices 106a-106n include an I/O interface 128, memory 130, a bus system 132, and one or more processing devices 134. These elements operate using similar principles and perform similar functions to the I/O interface 114, memory 116, bus system 118, and one or more processing devices 120 described in connection with the server system 104. Any combination of the I/O interface 128, memory 130, bus system 132, and one or more processing devices 134, however, may be implemented or otherwise configured using different hardware and software to that of the I/O interface 114, memory 116, bus system 118, and one or more processing devices 120 described above. The one or more computing devices 106a-106n can be any of a laptop computer, a desktop computer, a handheld computer, a mobile phone, or any other computing device capable of executing one or more applications.

In an example, the memory 130 includes one or more applications 136 that can present a graphical user interface in a display device 138 of the computing device (e.g., computing device 106b). The display device 138 may be a touch-sensitive device, enabling a user to provide user input by touching, gesturing, or otherwise making physical contact with the display device 138. In a particular example, one of the one or more applications 136 is an application that provides information indicative of venue that are located within a geographic region of interest to the user. In this example, the application can limit the presentation of information indicative of venues to popular venues as determined by the server system 104. Also, in this example, the application may present demographic data and psychographic data about one or more users who have interacted with the locations. As described above, the demographic data and psychographic data can be determined by the server system 104 and can be associated with the particular venues. In a particular example, the demographic data and psychographic data are presented to the user by providing one or more graphical representations of the data (e.g., charts, graphs, and other graphical representations).

The application 136 can be configured to communicate with the server system 104 using the interface 128. In response, the server system 104 may provide information indicative of popular venues to the application, which the application can present on the display device 138 using one or more graphical user interfaces. In addition, these user interfaces may include demographic data and psychographic data received from the server system 104. As described above, the demographic data and psychographic data may be used to describe one or more users that interact or are otherwise connected to one or more of the one or more venues. In an example, this demographic data and psychographic data may be determined by the server system 104 from user data stored in the data store 112 of the social networking platform 102. In this example, the demographic data and the psychographic data about one or more users that interact with the one or more venues (e.g., by performing one or more affirmative actions on the social networking platform 102) may be presented to the user in a number of different graphical user interfaces to provide different graphical representations of the demographic data and the psychographic data. In addition, in this example, the graphical user interfaces may facilitate one or more user interactions to allow a user of the application to configure or otherwise filter the type of information that is displayed. A number of these graphical user interfaces are described in more detail below, although they represent an illustrative sample and not an exhaustive collection of graphical user interfaces.

FIGS. 2A-2G illustrate examples of graphical user interfaces 200, 210, 220, 230, 240, 250, 260, respectively, for an example of an application that presents data indicative of perceived popularities of one or more venues and/or types of users that frequent one or more venues. In general, FIGS. 2A-2G are discussed as part of an example workflow. For example, a user may launch or otherwise log into an application executing on one of the one or more computing devices 106a-106n. Then, the user may provide a search query or other user input that specifies one or more types of venues that the user would like to locate within a geographic region of interest.

In response, the application may provide a request for information that is received by the server system 104. In an example, the request for information corresponds to the user input and is indicative of a geographic region of interest and/or one or more filtering criteria. In some implementations, the filtering criteria may correspond to a type of venue, a type of user, or both. In some implementations, a ranking of particular venues may also be provided as filtering criteria. In a particular example, only the top five most popular venues can be provided as filtering criteria. In another example, venues can be filtered according their respective hours of operation. The system may then provide a collection of data corresponding to the request that is received by the application. Once received, the application can present a first view of the data in a first graphical user interface and allow the user to change data views by interacting with one or more components of the first graphical user interface. FIGS. 2A-2G are also described with respect to the system 100 described above in reference to FIG. 1. Different systems may be implemented to provide, to the application, information indicative of venues and associated demographic data and psychographic data that corresponds to users who interact with the venues.

In some implementations, at least some of the information presented in the graphical user interfaces 200, 210, 220, 230, 240, 250, and 260 can be based on historical information about one or more of the users. In a particular example, a user Bob may have frequented "Joe's Sports Bar" when he was single and in college (and therefore associated with a type of user that included the characteristics of being single as a relationship status and in college as an education level). As Bob ages he may get married and have children, but the server system 104 may use Bob's change in relationship status to avoid associating "Joe's Sports Bar" with Bob's a more recent demographic characteristic of having a relationship status of married, for example.

In some implementations, the graphical user interfaces 200, 210, 220, 230, 240, 250, 260 that are represented by different illustrations may be a single graphical view that provides some functionality allowing the different portions of the singe view to be seen by a user after the user provides a user input. For example, and as will be described in more detail below, the user interfaces 230, 240, 250, 260 shown in FIGS. 2D-2G, respectively, may be implemented as a single graphical view. In this example implementation, when a user provides a swiping gesture as user input to the touch-sensitive display device for one of the computing devices 106a-106n, the application executing on the computing device can present a different portion of the single view. In an example, the graphical user interfaces 200, 210, 220, 230, 240, 250, 260 provide anonymized demographic data and psychographic data. That is, information identifying demographic and/or psychographic characteristics of particular users can be removed.

Referring now to FIG. 2A, an example graphical user interface 200 is shown. In general, the graphical user interface 200 allows a user to provide one or more filtering criteria that can be used to identify one or more popular venues within a selected geographic region of interest. For example, a user may select one or more types of venues (e.g., bars, nightlife, coffee shops, combinations of these, or other types of venues) for which the user would like to identify one or more popular venues within the geographic region of interest. As another example, a user may select one or more types of users (e.g., single men, single women, sports lovers, movie lovers, combinations of these, or other types of users) that frequent or otherwise interact with one or more venues within the geographic region of interest. A user can initiate a search for one or more popular businesses based on the selected filtering criteria. For example, by selecting both a type of venue and a type of user, the user indicates a desire to identify one or more popular venues of the selected type that are frequented or are interacted with by users of the selected type of user. Also, and as described in more detail above, an application that presents the graphical user interface 200 can communicate with a server (e.g., the server system 104) to provide information responsive to the request.

In an example, the graphical user interface 200 can be presented by one of the applications 136 executing on one of the computing devices 106a-160n that is configured to present information indicative of one or more venues in a geographic region of interest. In an example, the graphical user interface 200 includes an options region 202, a venue filter region 204, a geographic region user interface component 206, and a crowd type filter region 208.

In this example, the options region 202 presents user interface components 202a and 202b. When, for example, a user selects the user interface component 202a, the application may change the manner in which the venues are presented to the user. In one example, when a user selects the user interface component 202a, the application changes from showing the venues in the geographic region user interface component 206 to presenting the venues in a list, as shown in reference to FIG. 2C. In addition, in this example, when a user selects the user interface component 202b, the application may present one or more options to the user for posting their activity within the application to one or more social networking platforms. In an example, a user may share the presented graphical user interface on the social networking platform 102. In another example, a user may check-in to a venue. In yet another example, "share" a venue (or a list of venues and the filtering criteria that generated that list). In yet another example, a user may share one or more saved search criteria that are used to identify one or more venues. In addition, or alternatively, a user may instead opt to electronically mail a copy of the presented graphical user interface (e.g., take a screen shot of the current graphical user interface and provide it as an attachment in an e-mail or other electronic communication). In addition, in another example, when a user selects the user interface component 202b, the user may obtain additional information about the application or logout of the application.

The venue filter region 204 may allow a user to select the type of venue(s) that the user would like to locate. In an example, the venue filter region 204 includes a number of user interface components 204a-204d. These user interface components 204a-204d may correspond to particular types of venues for which popularity scores can be determined. For example, user interface components 204a-204d may represent restaurants, bars, nightlife, coffee shops, respectively, or a variety of other types of venues. When a user selects one of the user interface components 204a-204d, the application may present information indicative of venues of that particular type to the user. In a particular example, a user can press one of the user interface components 204a-204d using the touch-sensitive display of a computing device to make a selection. In response, the application can provide the selected venue type to the server system 104. As a result of receiving the provided selection, the server system 104 can identify one or more venues in the geographic region of interest based on a determined popularity score relative to other venues in the geographic region of interest having the same or similar venue type. These identified venues can be provided by the server system 104 to the application and presented in the graphical user interface 200.

The geographic region user interface component 206 may present a geographic region of interest and one or more venues that are located within that geographic region of interest. In an example, the region for which venues locations are identified is defined by what is presented in the geographic region user interface component 206. That is, in general, venues that are outside the geographic region user interface component 206 may not be considered.

In an example, a user can modify the geographic region user interface component 206 presented by providing user input. In one example, a user may scroll the geographic region user interface component 206 by providing user input indicative of a request to scroll the geographic region user interface component 206, such as when a user makes physical contact with a finger on a touch-sensitive display device and then moves the finger within the geographic region user interface component 206. In response to receiving the user input, the region of interest displayed within the geographic region user interface component 206 may move in the direction of the request to scroll.

In another example, a user may provide user input indicative of a request to zoom in or out within the geographic region user interface component 206, such as when a user makes physical contact with two fingers on a touch-sensitive display device and provides tactile input, such as by moving the fingers towards each other, moving the fingers apart from each other, and so forth. In response to receiving the user input, the geographic region user interface component 206 may zoom in or zoom out to reflect the request to zoom. In a particular example, information indicative of the twenty most popular venues within the geographic region of interest is presented to a user. In this example, the popularity of the venues are determined relative to each other and based on affirmative actions of the users performed on the social networking platform 102, as will be described in more detail below. In some implementations, the server system 104 (FIG. 1) may perform one or more techniques to combine or otherwise filter the identified venues within the geographic region of interest. In an example, the server system 104 can compare one or more venue names with a trusted source to remove erroneous names (e.g., one venue may be associated with a trusted name of "Joe's Sports Bar," while another venue may be associated with a name "Joes Sports Bar"). In a particular example, even though only "Joe's Sports Bar" is presented, the affirmative actions that are performed for both "Joe's Sports Bar" and "Joes Sports Bar" can be combined so that information indicative of the popularity of "Joe's Sports Bar" is not otherwise lost. In some implementations, when the affirmative actions are combined, duplicate actions by a same user may be removed. In a particular example, if user Bob "likes" "Joes Sports Bar" on a social networking platform 102 (FIG. 1) and Bob also checks-in at "Joe's Sports Bar," Bob's affirmative action of liking "Joes Sports Bar" may be removed.

In the illustrated example, the geographic region user interface component 206 presents a region of interest around the Washington, D.C. area. In addition, in this illustrated example, the geographic region user interface component 206 presents location representations, such as location representations 207a, 207b, and 207c, of the most popular venues in the region of interest. In a particular example, the representations are push-pins that show approximate locations of particular venues within the geographic region of interest. In an example, the push-pins are selectable. In this particular example, each representation includes a number that represents a popularity ranking for each of the presented venues. That is, a venue that is associated with a representation labeled number "1" has been determined by the server system 104 to be more popular than a venue that is associated with a representation that is labeled "4." Also, in this particular example, a user may touch a region of the touch-sensitive display to select one of the representations. In response, and as will be described in reference to FIG. 2B, the application may present additional information about the selected venue.

Still referring to FIG. 2A, the crowd type filter region 208 provides one or more user interface components by which a user of the application can select a particular crowd type. This selected crowd type may be used to define which venues are shown in the graphical user interface 200 by presenting venues that are popular with the selected crowd type. In addition, as an example, a user can select user interface component 208a to indicate a desire to change crowd types.

In response, the application may present a graphical user interface allowing the user to select a particular crowd type. One example user interface that allows a user to select a crowd type is shown in reference to FIG. 3A (as described in more detail below). In an example, once a crowd type has been selected, a popularity score for venues within the region of interest with users belonging to the selected crowd type may be determined. In the illustrated example, a popularity score for "Bars" in the geographic region of interest can be determined for users of the social networking platform that belong to the "Sports Lovers" crowd type. In an example, these popularity scores are determined relative to other venues in the geographic region of interest for people belonging to the "Sports Lovers" crowd type. For example, and as will be described in more detail below, the server system 104 can compute a weighted score of the affirmative actions performed by users of the social networking platform that belong to the "Sports Lovers" crowd type to determine a popularity score for each venue within the geographic region of interest.

Referring now to FIG. 2B, another graphical user interface 210 is shown. In some implementations, the graphical user interface 210 may be shown after receiving user input indicative of a zoom request and in response to user input indicative of selecting a particular venue in the selected geographic region of interest. In this particular example, graphical user interface 210 presents a zoomed-in portion of the map shown in the graphical user interface 200 shown in FIG. 2A. In addition, graphical user interface 210 presents information in response to the user selecting a particular location representation. In this particular example, the graphical user interface 210 is presented in response to the user selecting the location representation that corresponds to location "1" (e.g., as illustrated by location representation 207a) in the geographic region user interface component 206. That is, if a user selects one of the representations, such as location representation 207a, 207b, or 207c, described above with respect to FIG. 2A, the application may present graphical user interface 210 in response. The graphical user interface 210 shares many of the same user interface components as graphical user interface 200. For example, graphical user interface 210 also includes an options region 202, a venue filter region 204, a geographic region user interface component 206, and a crowd type filter region 208.

In an example, the geographic region user interface component 206 includes a user interface component 211. In this example, the user interface component 211 is presented in response to receiving user selection of a location representation in the geographic region user interface component 206. In a particular example, the user interface component 211 is shown in response to the user selecting the location representation that corresponds to location "1" 207a in the geographic region user interface component 206. In an example, the user interface component 211 may include one or more user selectable controls 213a and 213b that enable a user to change which venue is shown in user interface component 211.

The user interface component 211 provides the user with at least some of the demographic data and/or psychographic data that is associated with the one or more users that frequent or otherwise interact with the selected venue. In this particular example, a region 211c of the user interface component 211 shows information that corresponds to a percentage of the users (based on gender) of the social networking platform 102 (FIG. 1) who are frequenting or otherwise interacting with the particular venue (e.g., by performing one or more affirmative actions on the social networking platform 102). Likewise, in this particular example, a region 211d shows a relationship status that corresponds to a percentage of users (based on relationship status) of the social networking platform 102 (FIG. 1) who are frequenting or otherwise interacting with the particular venue (e.g., by performing one or more affirmative actions on the section networking platform 102). Also, in this particular example, a region 211e shows an average age that corresponds to the average age of all of the users of the social networking platform that have frequented or otherwise interacted with the particular venue.

In this example, if a user selects user selectable control 213a, a venue that precedes the currently selected venue based on the venue's popularity score is presented. In a particular example, if information indicative of a most popular venue is presented in the user interface component 211 (i.e., the venue that has the highest relative popularity score), and the user selectable control 213a is selected, the preceding venue would be the least popular venue (or the venue with the lowest relative popularity score) of those venues identified. For example, if twenty popular venues are identified, the least popular venue in this context would be the twentieth most popular venue in the selected geographic region of interest. Similarly, when a user selects the user selectable control 213b, a venue that succeeds the currently selected venue based on the venue's popularity score is presented. In a particular example, when a venue with the highest popularity score is shown and a user selects the user selectable control 213b, the next most popular venue would be shown in user interface component 211.

In this example, the user interface component 211 includes a text region 211a that presents the name of the particular venue. Also in this example, the user interface component 211 may include a text region 211b that presents the number of users of the social networking platform that have performed a "check-in" at the particular venue as provided by the server system 104.

The user interface component 211 also includes a selectable user interface component 211f that, where selected, indicates to the application that the user would like to see additional demographic data and psychographic data about the one or more users that frequent or otherwise interact with the selected venue. In response, the application may present additional demographic data and psychographic data in another user interface. In a particular example, graphical user interfaces 230, 240, 250, 260 shown in connection with FIGS. 2D-2G, respectively, may be presented to the user allowing the user to view additional demographic data and psychographic data about the selected venue. This additional information may help the user to determine whether to visit the venue. For example, the additional information may help the user get a sense for what people at the venue might be like. If for example, the user approves of or otherwise feels a connection with the one or more crowd types associated with people that might be at the venue, the user may be more likely to visit the venue.

Referring now to FIG. 2C, in addition to or instead of presenting a geographic region user interface component 206 that includes information indicative of one or more popular venues as illustrated in FIGS. 2A and 2B, a list of popular venues can be provided in a list region 222 of the graphical user interface 220. The graphical user interface 210 shares many of the same user interface components as graphical user interface 200. For example, graphical user interface 220 also includes an options region 202, a venue filter region 204, and a crowd type filter region 208. In an example, the options region 202 includes an interface component 202c that when selected presets the list 220 as a collection of representations in a geographic region user interface component 206 of the graphical user interface 200 of FIG. 2A. That is, by selecting user interface component 202c, a user can switch from the list shown in reference to FIG. 2C to the geographic region of interest shown in reference to FIG. 2A.

Still referring to FIG. 2C, the list presented in the list region 222 can present one or more venues located in the geographic region of interest ordered by their relative popularity. In the illustrated example, the list region 222 presents the one or more venues in ascending order of popularity with the more popular venues at the top of the list and the less popular venues at the bottom of the list. The list region 222 may also present the venues in a descending order of popularity. In an example, the list region may be scrollable. That is, a user may provide a vertical swiping gesture as input to the touch-sensitive display device to scroll the list in the direction of the gesture (e.g., either up or down).

In an example, each item of the list includes similar information to that shown with respect to the user interface component 211 shown in reference to FIG. 2B. In this example, each of the items in the list includes a graphical region, such as graphical regions 224a-224c, where particular information about the particular venue is displayed. In the illustrated example, the graphical region 224a includes a text region 225a that presents the name of the particular venue. Also in this illustrated example, the graphical region 224a may include a text region 225b that presents the city and state where the venue is located. Yet still in this illustrated example, the graphical region 224a may also include a text region 225c that presents the number of users of the social networking platform that have performed a "check-in" at the particular venue as provided by the server system 104.

Similar to the user interface component 211, the graphical region 224a may also include at least a subset of the demographic data, psychographic data, or both for one or more users that frequent or otherwise interact with a particular venue. As described above, the demographic data and psychographic data may be received from the server system 104 and be associated with the particular venue. In this particular example, a region 225d of the graphical region 224a shows information that corresponds to a percentage of the users (based on gender) of the social networking platform 102 (FIG. 1) who are frequenting or otherwise interacting with the particular venue (e.g., by performing one or more affirmative actions on the social networking platform 102). Likewise, in this particular example, a region 225*e* shows a relationship status that corresponds to a percentage of users (based on relationship status) of the social networking platform 102 (FIG. 1) who are frequenting or otherwise interacting with the particular venue (e.g., by performing one or more affirmative actions on the section networking platform 102). Also, in this particular example, a region 225*f* shows an average age that corresponds to the average age of all of the users of the social networking platform that have frequented or otherwise interacted with the particular venue.

If a user wishes to obtain information about a particular venue presented in the list region 222, the user may provide a user input indicative of such a desire. In an example, the user may touch or otherwise provide physical contact with the touch-sensitive display device within the graphical region 224*a* to indicate that the user wishes to view additional demographic data and psychographic data for one or more users that frequent or otherwise interact with the particular venue. In response, and similar to when a user selects user interface element 211*f* (FIG. 2B) described above, the application may present graphical user interfaces 230, 240, 250, 260 shown in connection with FIGS. 2D-2G, respectively, to allow the user to view additional demographic data and psychographic data for one or more users that frequent or otherwise interact with the selected venue. In some implementations, this demographic data and psychographic data is accessed by the server system 104 (FIG. 1) and from the social networking platform 102 (FIG. 1).

Referring now to FIGS. 2D-2G, graphical user interfaces 230, 240, 250, 260 are shown that provide additional demographic data and psychographic data for one or more users that frequent or otherwise interact with a selected venue. Any or all of the additional information may be based on one or more determinations made by the server system 104 with respect to user data accessed on the social networking platform 102. As described above, in one example, graphical user interfaces 230, 240, 250, 260 can be a single graphical view that may be scrolled to show additional information presented in any of FIGS. 2D-2G. For example, if a user is presented with graphical user interface 230 (FIG. 2D) and provides user input indicative of a request to scroll the graphical view downward, some portion(s) of graphical user interfaces 240, 250, 260 may be presented depending on the request to scroll.

Referring now to FIG. 2D, some additional demographic data is shown for one or more users that frequent or otherwise interact with a particular venue in graphical user interface 230. This additional information may help a user of the application determine whether to visit the venue. For example, if a user wants to meet people of the opposite sex, a combination of additional gender information and relationship status information may help the user decide if the user wants to visit the location. In an example, graphical user interface 230 may include a text region 232 indicating the name of the particular venue, a text region 234 indicating the city, state, country, and so forth for the particular venue, a text region 236 indicating a number of check-ins performed on the social networking platform 102 for the particular venue, and a text region 238 indicating a number of endorsements performed on the social networking platform 102.

The graphical user interface 230 may also include a number of graphical representations of demographic data for one or more users that frequent or otherwise interact with the particular venue. In an example, the graphical user interface 230 may include a visual indication 242, such as a slider, showing a percentage of males and females that frequent the venue. As another example, the graphical user interface 230 may show a visual representation 244, such as a bar chart, showing percentages of people having different relationship statuses among the people that frequent the venue. Also, the graphical user interface 230 may present a visual representation 246 of an average age of the people that frequent the particular venue.

Referring now to FIG. 2E, additional demographic data and psychographic data for one or more users that frequent or otherwise interact with the particular venue can be shown in graphical user interface 240. The graphical user interface 240 may include representations of demographic data and crowd types for one or more users that frequent or otherwise interact with the particular venue. In an example, graphical user interface 240 may present a visual representation 246 of an average age of the people that frequent the particular venue. In an example, graphical user interface 240 is a continuation of the visual representation shown in graphical user interface 230 (FIG. 2D) and may include additional visual representations, such as a bar chart, illustrating a breakdown of the various ages of people that frequent the particular venue. As another example, the graphical user interface 240 may include a graphical representation 248, such as an ordered list, that shows the more common crowd types associated with people that frequent the particular venue. Determining crowd types is described in more detail below.

In some implementations, the crowd types shown may be any of i) the one or more crowd types with which the venue is most popular (e.g., crowd types that have the greatest numbers of members who frequent or otherwise interact with a particular venue) or ii) one or more crowd types that have the greatest affinity with the venue. The information presented in graphical representation 248 may also provide information that allows a user to determine whether to visit a venue. For example, the graphical representation 248 suggests that the particular venue is most popular with food lovers, party-goers, sports lovers, music lovers, and television fans. If a particular user shares interests with one or more of these groups, the user may be more interested in visiting the venue.

Examples of techniques for determining if a user identity belongs to the different crowd types introduced above are now described. There may be a number of ways to determine a crowd type to which a user belongs. In an example, the application may determine if a user identity (and the corresponding human user that is associated with the user identity) belongs to a particular crowd type based on the extent to which the user identity has endorsed "pages" that the application identifies as corresponding to the particular crowd type. As a candidate for a particular crowd type, the application may consider any user identity that includes an endorsement of at least one "page" that corresponds to the particular crowd. Other factors may also be used. In general, these factors can measure a strength of connection to other friends or fans of an interest (or venue). In a particular example, whether a particular user is mentioned in a post, can be used to measure a strength of connection between the user in the post and topic that is associated with the post. For a user identity that the application has identified as a candidate for a particular crowd type, the application then may calculate a crowd type page score for the user identity according to equation 1 below:

$$\text{crowd type page score} = A^2 \cdot B \quad \text{(Eq. 1)}$$

In the above equation 1, A represents the number of "pages" that the user identity has endorsed that correspond to the particular crowd type and B represents the total number of "pages" that the user identity has endorsed within the electronic social networking platform. As described in greater detail below, the application then may use the crowd type page score calculated for the user identity in determining if the user identity belongs to the particular crowd type.

Another factor the application may consider in determining whether a user identity belongs to a particular crowd type is the user identity's "check-ins" that the application extracted from the electronic social networking platform. Each crowd type may be defined as corresponding to a collection of certain "check-in" locations. The collection of "check-in" locations corresponding to any particular crowd type may be identified based on "check-in" locations that have been assigned one or more category designations within the electronic social networking platform and/or "check-in" locations that have been assigned one or more category designations by the application (e.g., specific "check-in" locations that have been hardcoded as belonging to one or more different categories by the application itself). The application may determine if a user identity belongs to a particular crowd type based on the extent to which the user identity has "checked-in" at locations that the application identifies as corresponding to the particular crowd type.

Various different techniques may be employed to determine if a user identity belongs to the music lovers crowd type. One particular example is described below. The music lovers crowd type may be defined as corresponding to "pages" categorized within the electronic social networking platform as musician/band, musical genre, song, music video, and music. If a user identity has endorsed any "page" within the electronic social networking platform categorized as belonging to any one of these categories, the application may consider the user identity to be a candidate for the music lovers crowd type and calculate a crowd type page score for the user identity. If the crowd type page score for the user identity is within a predefined top percentile (e.g., the top 20%) of crowd type page scores for all user identities identified as candidates for the music lovers crowd type, then the application may determine that the user identity belongs to the music lovers crowd type. Even if the application determines that the user identity's "page" endorsements do not qualify the user identity for membership in the music lovers crowd type, the application still may determine that the user identity belongs to the music lovers crowd type based on the user identity's "check-in" activity. For example, the application may determine that the user identity belongs to the music lovers crowd type if the user identity has "checked-in" to locations classified by the electronic social networking platform and/or the application as concert/music venues or music stores more than six times within the previous six months.

Various different techniques may be employed to determine if a user identity belongs to the movie lovers crowd type. One particular example is described below. The movie lovers crowd type may be defined as corresponding to "pages" categorized within the electronic social networking platform as movie, actor/director, movie genre, movie theater, and movie general. If a user identity has endorsed any "page" within the electronic social networking platform categorized as belonging to any one of these categories, the application may consider the user identity to be a candidate for the movie lovers crowd type and calculate a crowd type page score for the user identity. If the crowd type page score for the user identity is within a predefined top percentile (e.g., the top 20%) of crowd type page scores for all user identities identified as candidates for the movie lovers crowd type, then the application may determine that the user identity belongs to the movie lovers crowd type. Even if the application determines that the user identity's "page" endorsements do not qualify the user identity for membership in the movie lovers crowd type, the application still may determine that the user identity belongs to the movie lovers crowd type based on the user identity's "check-in" activity. For example, the application may determine that the user identity belongs to the movie lovers crowd type if the user identity has "checked-in" to locations classified by the electronic social networking platform and/or the application as movie theaters at least once a week every week for the previous six months.

Various different techniques may be employed to determine if a user identity belongs to the TV fans crowd type. One particular example is described below. The TV fans crowd type may be defined as corresponding to "pages" categorized within the electronic social networking platform as TV show, TV network, TV channel, TV, and TV genre. If a user identity has endorsed any "page" within the electronic social networking platform categorized as belonging to any one of these categories, the application may consider the user identity to be a candidate for the TV fans crowd type and calculate a crowd type page score for the user identity. If the crowd type page score for the user identity is within a predefined top percentile (e.g., the top 20%) of crowd type page scores for all user identities identified as candidates for the TV fans crowd type, then the application may determine that the user identity belongs to the TV fans crowd type.

Various different techniques may be employed to determine if a user identity belongs to the social activists crowd type. One particular example is described below. The social activists crowd type may be defined as corresponding to "pages" categorized within the electronic social networking platform as non-profit organization and cause. If a user identity has endorsed any "page" within the electronic social networking platform categorized as belonging to any one of these categories, the application may consider the user identity to be a candidate for the social activist crowd type and calculate a crowd type page score for the user identity. If the crowd type page score for the user identity is within a predefined top percentile (e.g., the top 20%) of crowd type page scores for all user identities identified as candidates for the social activist crowd type, then the application may determine that the user identity belongs to the social activist crowd type.

Various different techniques may be employed to determine if a user identity belongs to the sports lovers crowd type. One particular example is described below. The sports lovers crowd type may be defined as corresponding to "pages" categorized within the electronic social networking platform as athlete, professional sports team, sports league, sports/recreation/activities, recreation/sports, amateur sports team, school sports team, sport, and sports. If a user identity has endorsed any "page" within the electronic social networking platform categorized as belonging to any one of these categories, the application may consider the user identity to be a candidate for the sports lovers crowd type and calculate a crowd type page score for the user identity. If the crowd type page score for the user identity is within a predefined top percentile (e.g., the top 20%) of crowd type page scores for all user identities identified as candidates for the sports lovers crowd type, then the application may determine that the user identity belongs to the sports lovers crowd type. Even if the application determines that the user identity's "page" endorsements do not qualify the user identity for membership in the sport lovers crowd type, the application still may determine that the user identity belongs to the sport lovers crowd type based on the user identity's "check-in" activity. For example, the application may determine that the user identity belongs to the sport lovers crowd type if the user identity has "checked-in" to locations classified by the electronic social networking platform and/or the application as sporting venues more than six times within the previous six months.

Various different techniques may be employed to determine if a user identity belongs to the food lovers crowd type. One particular example is described below. The food lovers crowd type may be defined as corresponding to "pages" categorized within the electronic social networking platform as restaurant/café and food. If a user identity has endorsed any "page" within the electronic social networking platform categorized as belonging to any one of these categories, the application may consider the user identity to be a candidate for the food lovers crowd type and calculate a crowd type page score for the user identity. If the crowd type page score for the user identity is within a predefined top percentile (e.g., the top 20%) of crowd type page scores for all user identities identified as candidates for the food lovers crowd type, then the application may determine that the user identity belongs to the food lovers crowd type.

Even if the application determines that the user identity's "page" endorsements do not qualify the user identity for membership in the food lovers crowd type, the application still may determine that the user identity belongs to the food lovers crowd type based on the user identity's "check-in" activity. For example, the application may determine that the user identity belongs to the food lovers crowd type if the user identity has "checked-in" to locations classified by the electronic social networking platform and/or the application as restaurants at least once a week for the previous six months.

Various different techniques may be employed to determine if a user identity belongs to the book lovers crowd type. One particular example is described below. The book lovers crowd type may be defined as corresponding to "pages" categorized within the electronic social networking platform as book genre, book, author, and library. If a user identity has endorsed any "page" within the electronic social networking platform categorized as belonging to any one of these categories, the application may consider the user identity to be a candidate for the book lovers crowd type and calculate a crowd type page score for the user identity. If the crowd type page score for the user identity is within a predefined top percentile (e.g., the top 20%) of crowd type page scores for all user identities identified as candidates for the book lovers crowd type, then the application may determine that the user identity belongs to the book lovers crowd type.

Various different techniques may be employed to determine if a user identity belongs to the travel lovers crowd type. One particular example is described below. The travel lovers crowd type may be defined as corresponding to "pages" categorized within the electronic social networking platform as hotel, travel/leisure, bags/luggage, transportation, and transport/freight. If a user identity has endorsed any "page" within the electronic social networking platform categorized as belonging to any one of these categories, the application may consider the user identity to be a candidate for the travel lovers crowd type and calculate a crowd type page score for the user identity. If the crowd type page score for the user identity is within a predefined top percentile (e.g., the top 20%) of crowd type page scores for all user identities identified as candidates for the travel lovers crowd type, then the application may determine that the user identity belongs to the travel lovers crowd type.

Various different techniques may be employed to determine if a user identity belongs to the art connoisseurs crowd type. One particular example is described below. The art connoisseurs crowd type may be defined as corresponding to "pages" categorized within the electronic social networking platform as museum/art gallery, arts/humanities, and artist. If a user identity has endorsed any "page" within the electronic social networking platform categorized as belonging to any one of these categories, the application may consider the user identity to be a candidate for the art connoisseurs crowd type and calculate a crowd type page score for the user identity. If the crowd type page score for the user identity is within a predefined top percentile (e.g., the top 20%) of crowd type page scores for all user identities identified as candidates for the art connoisseurs crowd type, then the application may determine that the user identity belongs to the art connoisseurs crowd type. Even if the application determines that the user identity's "page" endorsements do not qualify the user identity for membership in the art connoisseurs crowd type, the application still may determine that the user identity belongs to the art connoisseurs crowd type based on the user identity's "check-in" activity. For example, the application may determine that the user identity belongs to the art connoisseurs crowd type if the user identity has "checked-in" to locations classified by the electronic social networking platform and/or the application as museums or art galleries on average once a month for the previous six months.

Various different techniques may be employed to determine if a user identity belongs to the health and beauty conscious crowd type. One particular example is described below. The health and beauty conscious crowd type may be defined as corresponding to "pages" categorized within the electronic social networking platform as health/wellness, vitamins/supplements, health/beauty, lifestyle, and spas/beauty/personal care or "pages" that include the keyword "fashion" in their descriptions. If a user identity has endorsed any "page" within the electronic social networking platform categorized belonging to one of these categories or that includes the keyword "fashion" in its description, the application may consider the user identity to be a candidate for the health and beauty conscious crowd type and calculate a crowd type page score for the user identity. If the crowd type page score for the user identity is within a predefined top percentile (e.g., the top 20%) of crowd type page scores for all user identities identified as candidates for the health and beauty conscious crowd type, then the application may determine that the user identity belongs to the health and beauty conscious crowd type. Even if the application determines that the user identity's "page" endorsements do not qualify the user identity for membership in the health and beauty conscious crowd type, the application still may determine that the user identity belongs to the health and beauty conscious crowd type based on the user identity's "check-in" activity. For example, the application may determine that the user identity belongs to the health and beauty conscious crowd type if the user identity has "checked-in" to locations classified by the electronic social networking platform and/or the application as fitness centers, or exercise, cosmetics, fashion, health and beauty, beauty products, fashion show, health and fitness, health and hygiene, or hair care locations at least once a week for the previous six months.

Various different techniques may be employed to determine if a user identity belongs to the game lovers crowd type. One particular example is described below. The game lovers crowd type may be defined as corresponding to "pages" categorized within the electronic social networking platform as games and games/toys. If a user identity has endorsed any "page" within the electronic social networking platform categorized as belonging to any one of these categories, the application may consider the user identity to be a candidate for the game lovers crowd type and calculate a crowd type page score for the user identity. If the crowd type page score for the user identity is within a predefined top percentile (e.g., the top 20%) of crowd type page scores for all user identities identified as candidates for the game lovers crowd type, then the application may determine that the user identity belongs to the game lovers crowd type.

Various different techniques may be employed to determine if a user identity belongs to the techies crowd type. One particular example is described below. The techies crowd type may be defined as corresponding to "pages" categorized within the electronic social networking platform as appliance, computers/Internet, computers/technology, Internet/software, software, and computers. If a user identity has endorsed any "page" within the electronic social networking platform categorized as belonging to any one of these categories, the application may consider the user identity to be a candidate for the techies crowd type and calculate a crowd type page score for the user identity. If the crowd type page score for the user identity is within a predefined top percentile (e.g., the top 20%) of crowd type page scores for all user identities identified as candidates for the techies crowd type, then the application may determine that the user identity belongs to the techies crowd type.

Various different techniques may be employed to determine if a user identity belongs to the comedy lovers crowd type. One particular example is described below. The comedy lovers crowd type may be defined as corresponding to "pages" categorized within the electronic social networking platform as comedians, comedy, or humor. If a user identity has endorsed any "page" within the electronic social networking platform categorized as belonging to any one of these categories, the application may consider the user identity to be a candidate for the comedy lovers crowd type and calculate a crowd type page score for the user identity. If the crowd type page score for the user identity is within a predefined top percentile (e.g., the top 20%) of crowd type page scores for all user identities identified as candidates for the comedy lovers crowd type, then the application may determine that the user identity belongs to the comedy lovers crowd type. Even if the application determines that the user identity's "page" endorsements do not qualify the user identity for membership in the comedy lovers crowd type, the application still may determine that the user identity belongs to the comedy lovers crowd type based on the user identity's "check-in" activity. For example, the application may determine that the user identity belongs to the comedy lovers crowd type if the user identity has "checked-in" to locations classified by the electronic social networking platform and/or the application as comedy clubs more than three times within the previous six months.

Various different techniques may be employed to determine if a user identity belongs to the car lovers crowd type. One particular example is described below. The car lovers crowd type may be defined as corresponding to "pages" categorized within the electronic social networking platform as automotive, cars, and automobiles and parts. If a user identity has endorsed any "page" within the electronic social networking platform categorized as belonging to any one of these categories, the application may consider the user identity to be a candidate for the car lovers crowd type and calculate a crowd type page score for the user identity. If the crowd type page score for the user identity is within a predefined top percentile (e.g., the top 20%) of crowd type page scores for all user identities identified as candidates for the car lovers crowd type, then the application may determine that the user identity belongs to the car lovers crowd type.

Various different techniques may be employed to determine if a user identity belongs to the brand conscious crowd type. One particular example is described below. The brand conscious crowd type may be defined as corresponding to "pages" categorized within the electronic social networking platform as jewelry/watches and clothing as well as the following specific "pages": Givenchy, Lord & Taylor, Calvin Klein Underwear, Donna Karan New York, GUESS by Marciano, UNITED COLORS OF BENETTON, DKNY, Lucky Brand, Nine West, Kenneth Cole, A|X Armani Exchange, Diesel, HUGO BOSS, BCBG-BCBGMAXAZRIA, GUESS? Inc., Juicy Couture, ARMANI, Barneys New York, INTERMIX, ALEXANDER WANG, bebe, Saks Fifth Avenue, Marc Jacobs Intl, Michael Kors—The Official Page, Neiman Marcus, Dolce & Gabbana, Tory Burch, Gucci, Burberry, ZARA, Victoria's Secret Pink, and Victoria's Secret. If a user identity has endorsed any "page" within the electronic social networking platform categorized as belonging the categories jewelry/watches or clothing or any of the other specific "pages," the application may consider the user identity to be a candidate for the brand conscious crowd type and calculate a crowd type page score for the user identity. If the crowd type page score for the user identity is within a predefined top percentile (e.g., the top 20%) of crowd type page scores for all user identities identified as candidates for the brand conscious crowd type, then the application may determine that the user identity belongs to the brand conscious crowd type.

Various different techniques may be employed to determine if a user identity belongs to the religious people crowd type. One particular example is described below. The religious people crowd type may be defined as corresponding to "pages" categorized within the electronic social networking platform as church/religious organization and religion. If a user identity has endorsed any "page" within the electronic social networking platform categorized as belonging to any one of these categories, the application may consider the user identity to be a candidate for the religious people crowd type and calculate a crowd type page score for the user identity. If the crowd type page score for the user identity is within a predefined top percentile (e.g., the top 20%) of crowd type page scores for all user identities identified as candidates for the religious people crowd type, then the application may determine that the user identity belongs to the religious people crowd type. Even if the application determines that the user identity's "page" endorsements do not qualify the user identity for membership in the religious people crowd type, the application still may determine that the user identity belongs to the religious people crowd type based on the user identity's "check-in" activity. For example, the application may determine that the user identity belongs to the religious people crowd type if the user identity has "checked-in" to locations classified by the electronic social networking platform and/or the application as churches, synagogues or places of worship at least six times within the previous six months.

Various different techniques may be employed to determine if a user identity belongs to the outdoor enthusiasts crowd type. One particular example is described below. The outdoor enthusiasts crowd type may be defined as corresponding to "pages" categorized within the electronic social networking platform as sports/recreation, outdoor gear, attractions/things to do, tours, and landmark. If a user identity has endorsed any "page" within the electronic social networking platform categorized as belonging to any one of these categories, the application may consider the user identity to be a candidate for the outdoor enthusiasts crowd type and calculate a crowd type page score for the user identity. If the crowd type page score for the user identity is within a predefined top percentile (e.g., the top 20%) of crowd type page scores for all user identities identified as candidates for the outdoor enthusiasts crowd type, then the application may determine that the user identity belongs to the outdoor enthusiasts crowd type.

Various different techniques may be employed to determine if a user identity belongs to the frequent travelers crowd type. One particular example is described below. The application may determine that the user identity belongs to the frequent travelers crowd type if the user identity has "checked-in" to locations classified by the electronic social networking platform and/or the application as airports or hotels or to locations that are more than one hundred miles away from his/her current residence city at least once a week for the previous six months.

Various different techniques may be employed to determine if a user identity belongs to the do-it-yourselfers crowd type. One particular example is described below. The do-it-yourselfers crowd type may be defined as corresponding to "pages" categorized within the electronic social networking platform as home/garden, farming/agriculture, household supplies, home improvement, and tools/equipment as well as the following specific "pages": IKEA, Lowe's Home Improvement, and The Home Depot. If a user identity has endorsed any "page" within the electronic social networking platform categorized as belonging to the categories home/garden, farming/agriculture, household supplies, home improvement, and tools/equipment or any of the other specific "pages," the application may consider the user identity to be a candidate for the do-it-yourselfers crowd type and calculate a crowd type page score for the user identity. If the crowd type page score for the user identity is within a predefined top percentile (e.g., the top 20%) of crowd type page scores for all user identities identified as candidates for the do-it-yourselfers crowd type, then the application may determine that the user identity belongs to the do-it-yourselfers crowd type.

Various different techniques may be employed to determine if a user identity belongs to the party-goers crowd type. One particular example is described below. To be considered as a potential member of the party-goer crowd type, the user identity may need to be within a defined age range (e.g., between 18 years old and 45 years old). Furthermore, the party-goers crowd type may be defined as corresponding to "pages" categorized within the electronic social networking platform as arts/entertainment/nightlife, bar, and club. If a user identity is within the defined age range and has endorsed any "page" within the electronic social networking platform categorized as belonging to any one of these categories, the application may consider the user identity to be a candidate for the party-goers crowd type and calculate a crowd type page score for the user identity. If the crowd type page score for the user identity is within a predefined top percentile (e.g., the top 20%) of crowd type page scores for all user identities identified as candidates for the party-goers crowd type, then the application may determine that the user identity belongs to the party-goers crowd type. Even if the application determines that the user identity's "page" endorsements do not qualify the user identity for membership in the party-goers crowd type, the application still may determine that the user identity belongs to the party-goers crowd type based on the user identity's "check-in" activity. For example, the application may determine that the user identity belongs to the party-goers crowd type if the user identity is within the defined age range and has "checked-in" to locations classified by the electronic social networking platform and/or the application as bars, nightclubs, or adult entertainment at least once a week over the previous six months.

Various different techniques may be employed to determine if a user identity belongs to the politics—Democrats crowd type. One particular example is described below. The politics—Democrats crowd type may be defined as corresponding to "pages" within the electronic social networking platform that represent politicians who are Democrats. If a user identity has endorsed at least some predefined number (e.g., 3) of "pages" that represent politicians who are Democrats, the application may determine that the user identity belongs to the politics—Democrats crowd type. Additionally or alternatively, the application may identify the user identity as belonging to the politics—Democrats crowd type if the user identity's profile indicates that the user identity is a Democrat or liberal leaning Various different techniques may be employed to determine if a user identity belongs to the pet lovers crowd type. One particular example is described below. The pet lovers crowd type may be defined as corresponding to "pages" categorized within the electronic social networking platform as pet supplies, animal, and animal breed. If a user identity has endorsed any "page" within the electronic social networking platform categorized as belonging to any one of these categories, the application may consider the user identity to be a candidate for the pet lovers crowd type and calculate a crowd type page score for the user identity. If the crowd type page score for the user identity is within a predefined top percentile (e.g., the top 20%) of crowd type page scores for all user identities identified as candidates for the pet lovers crowd type, then the application may determine that the user identity belongs to the pet lovers crowd type.

Various different techniques may be employed to determine if a user identity belongs to the brides-to-be crowd type. One particular example is described below. The application may determine that the user identity belongs to the brides-to-be crowd type if the user identity's profile indicates that the user identity's gender is female and that the user identity's relationship status is engaged. To be considered as a potential member of the brides-to-be crowd type if the user identity's profile does not indicate that the user identity is female and engaged, the user identity may need to be female, unmarried, and within a defined age range (e.g., between 17 years old and 58 years old). Furthermore, the brides-to-be crowd type may be defined as corresponding to "pages" that include one or more of the keywords "wedding," "bride," and "bridal" in their descriptions as well as the following specific pages: Kleinfeld Bridal (Official Page), 'DulhanExpo' Bridal Shows, BRIDES, and Washingtonian Bride & Groom. If a user identity is female, unmarried, and within the defined age range and has endorsed at least some threshold number (e.g., 3) of "pages" from among the specifically-identified pages or that include one or more of the keywords "wedding," "bride," and "bridal," then the application may determine that the user identity belongs to the brides-to-be crowd type.

Various different techniques may be employed to determine if a user identity belongs to the budget shoppers crowd type. One particular example is described below. The budget shoppers crowd type may be defined as corresponding to the following specific "pages": Half Price Books, Nasty Pig, Artbeads.com, Beyond the Rack, Belk, Soap.com, Kmart, Dollar General, QVC, Costco, Sears, Marshalls, Wal-Mart, Kohl's, and Target. If a user identity has endorsed any one of these specific "pages" within the electronic social networking platform, the application may consider the user identity to be a candidate for the budget shoppers crowd type and calculate a crowd type page score for the user identity. If the crowd type page score for the user identity is within a predefined top percentile (e.g., the top 20%) of crowd type page scores for all user identities identified as candidates for the budget shoppers crowd type, then the application may determine that the user identity belongs to the budget shoppers crowd type.

Various different techniques may be employed to determine if a user identity belongs to the deal hunters crowd type. One particular example is described below. The deal hunters crowd type may be defined as corresponding to any "page" that includes at least one of the keywords "bargains," "coupon," "groupon," "deals," "discount" and "thrifty" in its description. If a user identity has endorsed any "page" including at least one of these keywords in its description, the application may consider the user identity to be a candidate for the deal hunters crowd type and calculate a crowd type page score for the user identity. If the crowd type page score for the user identity is within a predefined top percentile (e.g., the top 20%) of crowd type page scores for all user identities identified as candidates for the deal hunters crowd type, then the application may determine that the user identity belongs to the deal hunters crowd type.

Various different techniques may be employed to determine if a user identity belongs to the politics—Republicans crowd type. One particular example is described below. The politics—Republicans crowd type may be defined as corresponding to "pages" within the electronic social networking platform that represent politicians who are Republicans. If a user identity has endorsed at least some predefined number (e.g., 3) of "pages" that represent politicians who are Republicans, the application may determine that the user identity belongs to the politics—Republicans crowd type. Additionally or alternatively, the application may identify the user identity as belonging to the politics—Republicans crowd type if the user identity's profile indicates that the user identity is a Republican or conservative leaning.

Various different techniques may be employed to determine if a user identity belongs to the parents of young kids crowd type. One particular example is described below. To be considered as a potential member of the parents of young kids crowd type, the user identity may need to be within a defined age range (e.g., between 17 years old and 45 years old) and have a relationship status specified as married or in a relationship. Furthermore, the parents of young kids crowd type may be defined as corresponding to "pages" categorized within the electronic social networking platform as baby goods/kids goods and games/toys as well as the following specific "pages": Gymboree, Toys "R" Us, Diapers.com, drugstore.com, Amazon.com, and eBay. If a user identity is within the defined age range, has a relationship status specified as married or in a relationship, and has endorsed any "page" within the electronic social networking platform categorized as baby goods/kids goods and games/toys or any one of the specifically identified pages, the application may consider the user identity to be a candidate for the parents of young kids crowd type and calculate a crowd type page score for the user identity. If the crowd type page score for the user identity is within a predefined top percentile (e.g., the top 20%) of crowd type page scores for all user identities identified as candidates for the parents of young kids crowd type, then the application may determine that the user identity belongs to the parents of young kids crowd type.

Various different techniques may be employed to determine if a user identity belongs to the environmentally aware crowd type. One particular example is described below. The environmentally aware crowd type may be defined as corresponding to the following specific "pages": Greenpeace Portugal, Greenpeace Mexico, National Wildlife Federation, National Park Foundation, Save The Waves, Greenpeace India, Keep Virginia Beautiful, Piedmont Environmental Council, Water.org, Solar on the White House, Greenpeace Akdeniz—Türkiye, Greenpeace USA, Oceana, Conservation International, Environmental Defense Fund, and Greenpeace International. If a user identity has endorsed any one of these specific "pages" within the electronic social networking platform, the application may consider the user identity to be a candidate for the environmentally aware crowd type and calculate a crowd type page score for the user identity. If the crowd type page score for the user identity is within a predefined top percentile (e.g., the top 25%) of crowd type page scores for all user identities identified as candidates for the environmentally aware crowd type, then the application may determine that the user identity belongs to the environmentally aware crowd type.

Various different techniques may be employed to determine if a user identity belongs to the charity minded crowd type. One particular example is described below. The charity minded crowd type may be defined as corresponding to "pages" categorized within the electronic social networking platform as cause, non-profit organizations, and non-governmental organization (NGO). If a user identity has endorsed any "page" within the electronic social networking platform categorized as belonging to any one of these categories, the application may consider the user identity to be a candidate for the charity minded crowd type and calculate a crowd type page score for the user identity. If the crowd type page score for the user identity is within a predefined top percentile (e.g., the top 20%) of crowd type page scores for all user identities identified as candidates for the charity minded crowd type, then the application may determine that the user identity belongs to the charity minded crowd type.

Various different techniques may be employed to determine if a user identity belongs to the shopping lovers crowd type. One particular example is described below. The shopping lovers crowd type may be defined as corresponding to "pages" categorized within the electronic social networking platform as clothing. If a user identity has endorsed any "page" within the electronic social networking platform categorized as belonging to the clothing category, the application may consider the user identity to be a candidate for the shopping lovers crowd type and calculate a crowd type page score for the user identity. If the crowd type page score for the user identity is within a predefined top percentile (e.g., the top 20%) of crowd type page scores for all user identities identified as candidates for the shopping lovers crowd type, then the application may determine that the user identity belongs to the shopping lovers crowd type.

Various different techniques may be employed to determine if a user identity belongs to the beverage lovers crowd type. One particular example is described below. The beverage lovers crowd type may be defined as corresponding to "pages" categorized within the electronic social networking platform as wine/spirits and drink. If a user identity has endorsed any "page" within the electronic social networking platform categorized as belonging to any one of these categories, the application may consider the user identity to be a candidate for the beverage lovers crowd type and calculate a crowd type page score for the user identity. If the crowd type page score for the user identity is within a predefined top percentile (e.g., the top 20%) of crowd type page scores for all user identities identified as candidates for the beverage lovers crowd type, then the application may determine that the user identity belongs to the beverage lovers crowd type.

Various different techniques may be employed to determine if a user identity belongs to the on-line shoppers crowd type. One particular example is described below. The on-line shoppers crowd type may be defined as corresponding to the following specific "pages": drugstore.com, Amazon.com, and eBay. If a user identity has endorsed any one of these specific "pages" within the electronic social networking platform, the application may consider the user identity to be a candidate for the on-line shoppers crowd type and calculate a crowd type page score for the user identity. If the crowd type page score for the user identity is within a predefined top percentile (e.g., the top 20%) of crowd type page scores for all user identities identified as candidates for the on-line shoppers crowd type, then the application may determine that the user identity belongs to the on-line shoppers crowd type.

Referring now to FIG. 2F, psychographic data (e.g., including crowd-type data) for one or more users that frequent or otherwise interact with the particular venue can be shown in graphical user interface 250. In an example, the graphical user interface 250 may include a visual representation 252, such as an ordered list with associated icons, showing psychographic data including top interests of people that frequent that particular venue. In some implementations, the psychographic data shown in the graphical user interface 250 may be the most popular social networking pages (e.g., interest objects) associated with one or more users that frequent or otherwise interact with the particular venue.

Figure 2G:
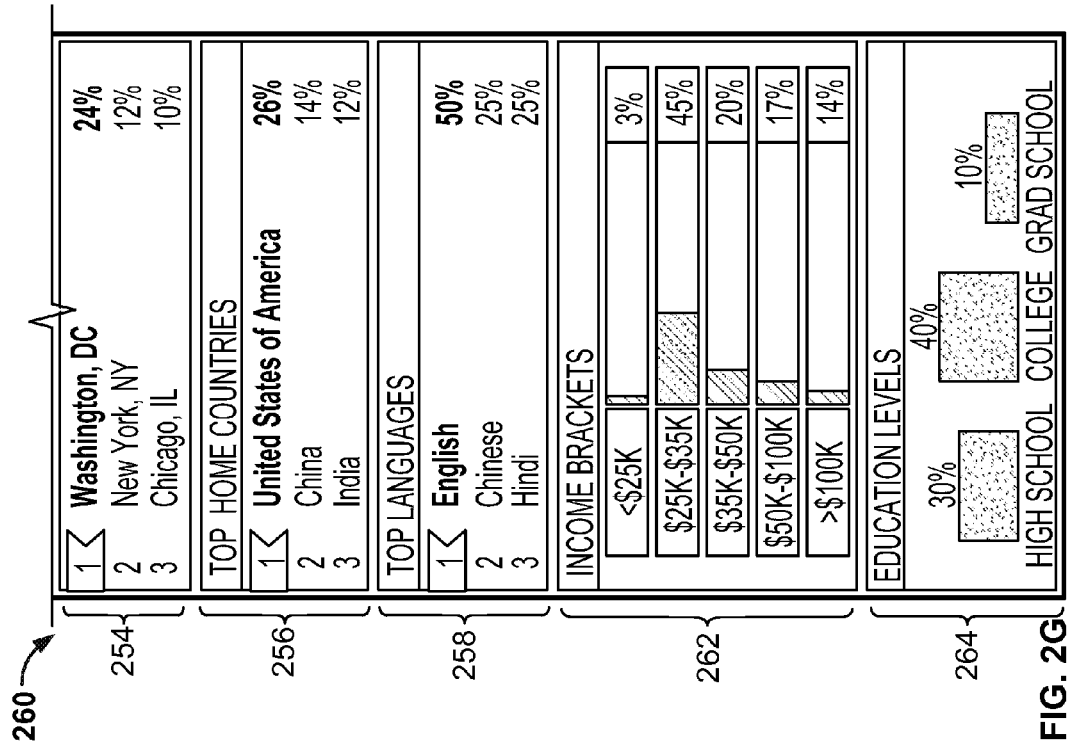

Referring now to FIG. 2G, additional demographic data for one or more users that frequent or otherwise interact with the particular venue can be shown in graphical user interface 260. In an example, the graphical user interface 260 may include a graphical representation 254, such as an ordered list, that shows the more common metro areas of current residence for people that frequent the particular venue. As another example, the graphical user interface 260 may include a visual representation 256, such as an ordered list that shows the more common home countries for people that frequent the particular venue. As still another example, the graphical user interface 260 may include a visual representation 258, such as an ordered list, that shows the more common languages spoken by people that frequent the particular venue. As another example, the graphical user interface 260 may include a visual representation 262, such as one or more bar charts that show the more common income brackets for people that frequent the particular venue. As still another example, the graphical user interface 260 may include a visual representation 264 (e.g., one or more bar charts) that shows the more common education levels for people that frequent the particular venue.

Figure 3A:
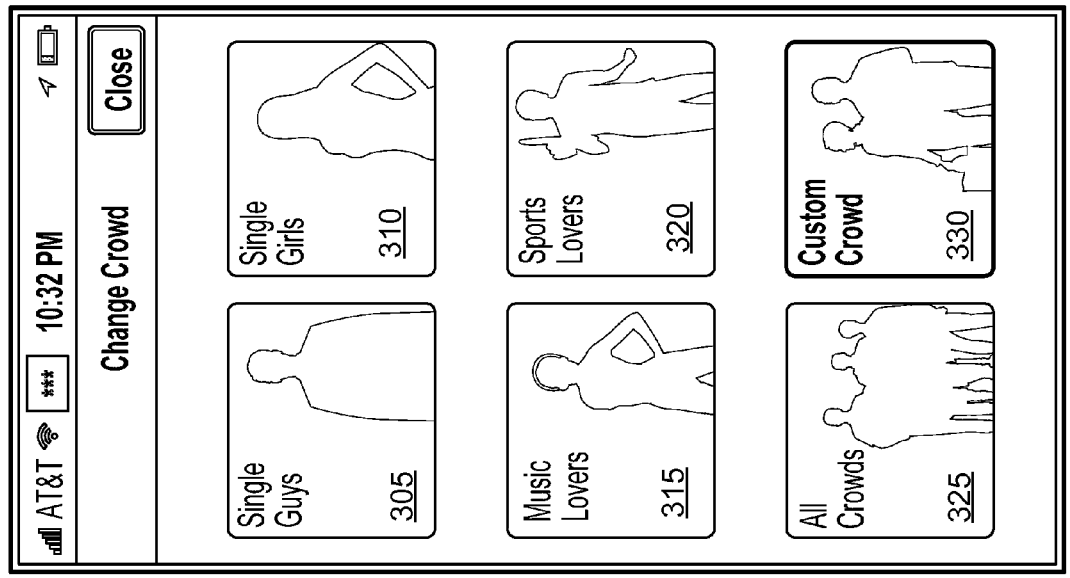
FIGS. 3A-3B illustrate examples of graphical user interfaces that can be used by a user of an example application to filter data based on a selected crowd type.

Referring now to FIG. 3A, a graphical user interface 300 is shown that can be used to select a crowd type. For example, by selecting one or more crowd types, the application may present one or more venues that are popular with the selected one or more crowd types. In a particular example, a user can select user interface component 208a (e.g., in FIG. 2A, 2B or 2C) to indicate a desire to change crowd types. In response, the application may present the user interface 300 that allows the user to select a particular predefined crowd type or to define a custom crowd type.

In an example, the user interface 300 includes five predefined crowd types that correspond to the "Single Guys" user interface component 305, the "Single Girls" user interface component 310, the "Movie Lovers" user interface component 315, the "Sports Lovers" user interface component 320, and the "All Crowds" user interface component 325. In an example, when one of these interface components is selected, the application may filter or otherwise provide a popularity score for venues using only the affirmative actions of the selected crowd type. In this way, a user can search for a type of venue that is popular with various, different crowd types.

By enabling a user to search a geographic region of interest using one or more selectable crowd types and one or more selectable venue types, the user is afforded a highly configurable user experience. For example, on a particular night a user may search for venues that are popular with movie lovers and on another night search for venues that are popular with sports lovers.

Figure 3B:
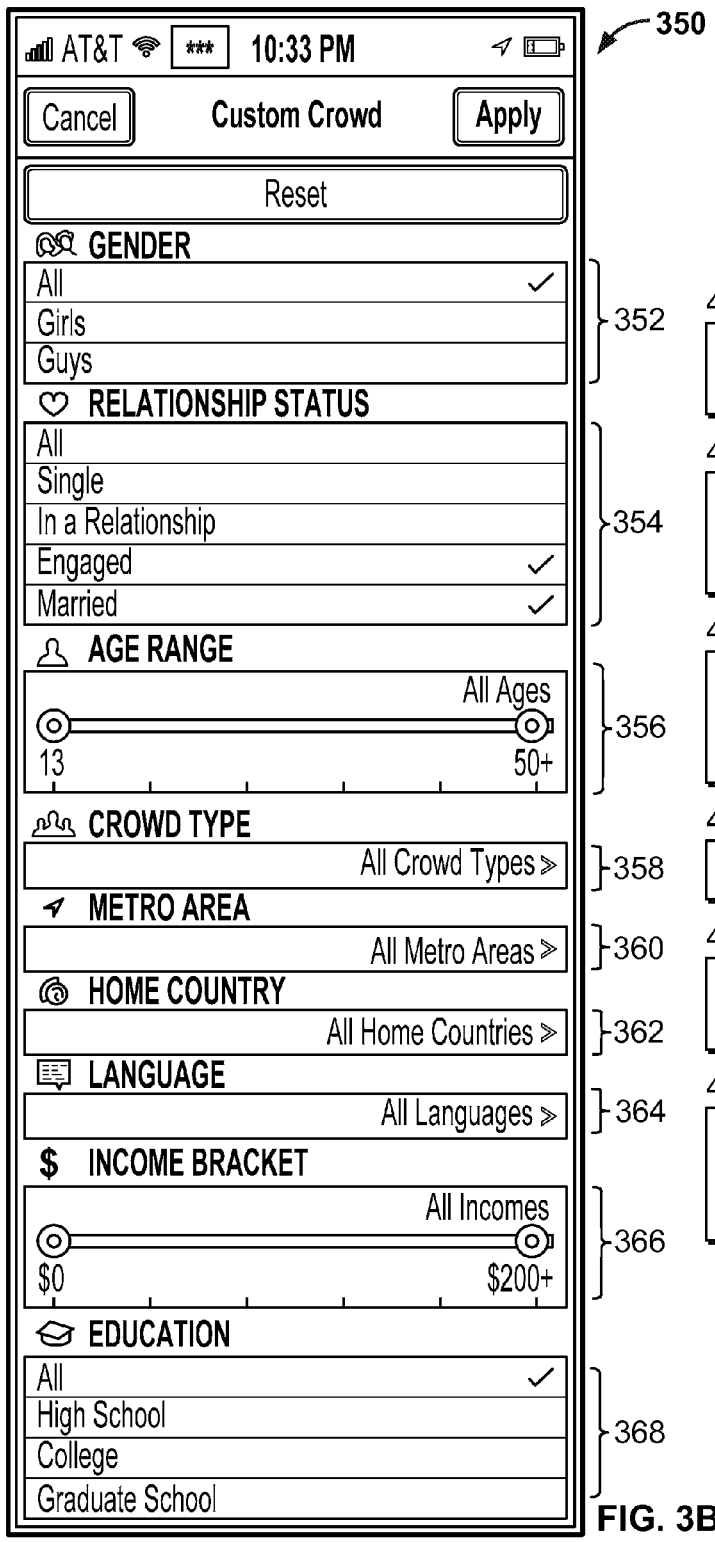

To provide additional configuration capabilities, a user may be able to specify a custom crowd type by selecting the user interface component 330. Referring now to FIG. 3B, in response, the application may present a graphical user interface 350. In an example, the graphical user interface 350 includes one or more user selectable user interface components 352, 354, 356, 360, 362, 364, 366, and 368 that enable the user to specify characteristics of a custom crowd type.

In an example, the selectable user interface component 352 enables a user to select characteristics of the custom crowd type according to gender determined from user data accessible from the social networking platform 102. In this example, the user interface component 352 allows a user to select male, female, or both as a characteristic of a custom crowd type.

In an example, the selectable user interface component 354 enables a user to select characteristics of the custom crowd type according to relationship status determined from user data accessible from the social networking platform 102. In this example, the user interface component 354 allows a user to select any or all of single, in a relationship, engaged, and married, although other relationship statuses may be available in other examples.

In an example, the selectable user interface component 356 enables a user to select characteristics of the custom crowd type according to an age range determined from user data accessible from the social networking platform 102. In this example, the user interface component 356 includes one or more slideable elements that allow a user to select both an upper bound and a lower bound for an age range. In one example, the age range may be between 13 and 60+.

In an example, the selectable user interface component 358 enables a user to select characteristics of the custom crowd type according to predefined crowd types to which particular users of the social networking platform 102 belong. In this example, once the selectable user interface component 358 is selected, a list including a large number of predefined crowd types is presented. A user may select any, all, or none of these presented crowd types. In an example, the predefined crowd types include, music lovers, movie lovers, TV fans, social activists, sports lovers, food lovers, book lovers, travel lovers, art connoisseurs, health and beauty conscious, game lovers, techies, comedy lovers, car lovers, brand conscious, religious people, outdoor enthusiasts, frequent travelers, do-it-yourselfers, party-goers, politics—Democrats, pet lovers, brides-to-be, budget shoppers, deal hunters, politics—Republicans, parents of young kids, environmentally aware, charity minded, shopping lovers, beverage lovers, and on-line shoppers, and other possible crowd types to which users of the social networking platform may belong.

In an example, the selectable user interface component 360 enables a user to select characteristics of the custom crowd type according to a metro area where particular users live as determined from user data accessible from the social networking platform 102. In this example, once the selectable user interface component 360 is selected, a list including a large number of predefined metro areas is presented. A user may select any, all, or none of these presented metro areas.

Some metro areas include Minneapolis, Washington, D.C., Belfast, and virtually any other known metro area in the world.

In an example, the selectable user interface component 362 enables a user to select characteristics of the custom crowd type according to a home country for particular users as determined from user data accessible from the social networking platform 102. In this example, once the selectable user interface component 362 is selected, a list including a large number of predefined countries is presented. A user may select any, all, or none of these presented countries. In one example, the presented list includes every country in the world, although a subset of these countries may be presented according to other examples.

In an example, the selectable user interface component 364 enables a user to select characteristics of the custom crowd type according to one or more languages that particular users know as determined from user data accessible from the social networking platform 102. In this example, once the selectable user interface component 364 is selected, a list including a large number of predefined languages is presented. A user may select any, all, or none of these presented languages. In one example, the presented list includes nearly every language in the world, although a subset of these languages may be presented according to other examples.

In an example, the selectable user interface component 366 enables a user to select characteristics of the custom crowd type according an income bracket for particular users as determined from user data accessible from the social networking platform 102. In this example, the user interface component 366 includes one or more slideable elements that allow a user to select both an upper bound and a lower bound for an income bracket. In one example the income bracket can be defined with a range of between $0 to $200,000+.

In an example, the selectable user interface component 368 enables a user to select characteristics of the custom crowd type according to an education level attained by particular users as determined from user data accessible from the social networking platform 102. In this example, the selectable user interface component 368 enables a user to select any, all, or none of a high school education level, a college education level, and a graduate school education level.

Figure 4:
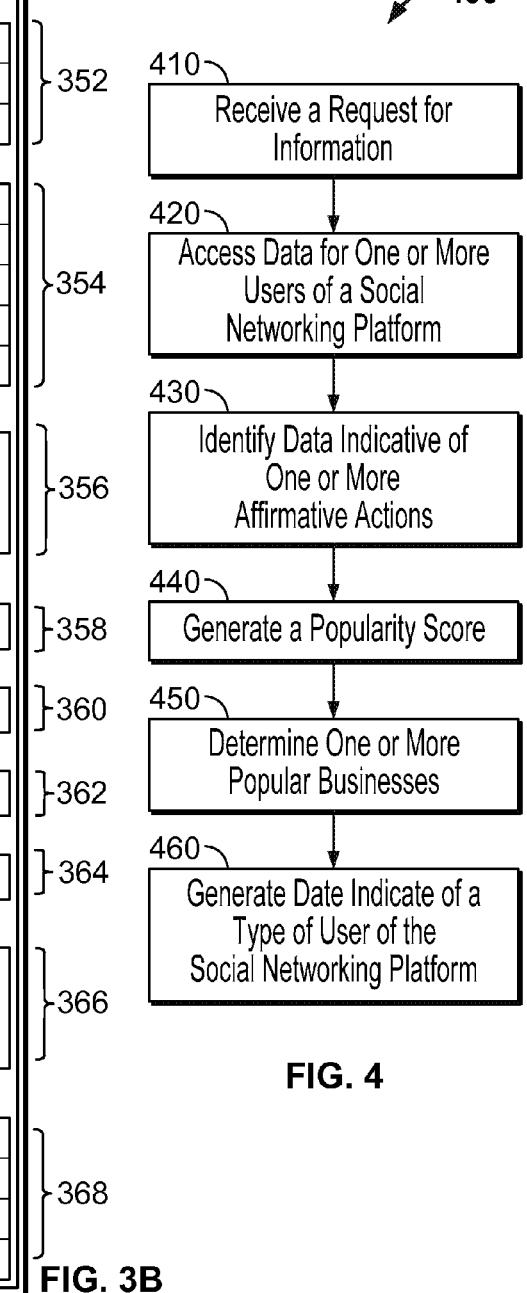
FIG. 4 is a flowchart showing an example of a process for generating data indicative of a type of user that frequents one or more of the venues.

Referring now to FIG. 4, a method 400 is shown that can be performed to determine popularity scores for venues in a region of interest. The determined popularity scores may be presented along with determined demographic data and psychographic data for one or more users that frequent or otherwise interact with the venues. Some aspects of the method 400 may be described in reference to the system 100 shown in FIG. 1, but other systems may also be used to perform the method 400.

A request for information can be received (410). In an example, the request can be for information indicative of venues that are located within a geographic region of interest. For example, a server system 104 may receive a request for information from a computing device 106 executing an application. Such a request may be responsive to an interaction between a user of the application and the application. In a particular example, the user may scroll or otherwise manipulate a geographic region user interface component, such as geographic region user interface component 206 (FIG. 2A), within the application to initiate the request for information indicative of venues that are located within the geographic region.

The user also may select one or both of a venue type and a crowd type for which the user would like to identify one or more venues that are located within the geographic region of interest. In some implementations, filtering by venue type indicates that the application should limit the venues presented to the user to those venues that match or otherwise satisfy the venue type filtering criteria. In some implementations, filtering by crowd type indicates that the application should limit the venues presented to the user to those venues that are popular with a crowd type that matches or otherwise satisfies the crowd type filtering criteria. For example, a user can interact with one or more of the user interface components 204a-204n and 208a as shown in FIG. 2A to select a venue type and a crowd type, respectively. In response, the application may generate a request for information that corresponds to the geographic region of interest and either or both of the selected venue type and the selected crowd type. The request may be sent by a computing device 106a-106n to the server system 104.

Data for one or more users of a social networking platform can be accessed (420). In one example, a data extractor 126 executing on the server system 104 may access user data stored in a data store 112 of the social networking platform 102. In this example, the accessed user data may include demographic data and psychographic data for a particular user on the social networking platform and demographic data and psychographic data for one or more other users of the social networking platform with one or more social connections to the particular user in the social networking platform. In another example, data for one or more users of the social networking platform can be accessed by the server system 104 (FIG. 1) from the social networking platform 102 (FIG. 1) and be periodically cached by the server system 104 and stored in the demographic data and psychographic data 122 (FIG. 1). This cached data may be accessed instead of, or in addition to, accessing user data stored in the data store 112, as described above.

Data indicative of one or more affirmative actions performed by one or more users on the social networking platform 112 can also be identified (430). In an example, the server system 104 can access user data in the data store 112 of the social networking platform. Because the user data likely contains one or more affirmative actions (e.g., that a user endorsed content on the social networking platform, that a user posted content on the social networking platform, that a user checked-in to a location, and so forth), the server system 104 can identify these affirmative actions using a number of different techniques. In a particular example, the server system 104 may attempt to identify affirmative actions that include an action of endorsing content available on the social networking platform by identifying one or more "likes" in the user data for a particular user. In another particular example, the server system 104 may attempt to identify an action of checking into a geographic location by identifying a data object that indicates that a particular user has checked into a particular location. As yet another particular example, the server system 104 may attempt to identify an action of posting content on the social networking platform by identifying a data object that indicates that a particular user generated a post on a page of another user of the social networking platform. As yet another particular example, the server system 104 may attempt to identify an action of adding a tag to content posted on the social networking platform by identifying a data object that is indicative of the tag that has been added to the content. In an example, the server system 104 may attempt to identify affirmative actions for each user of the social networking platform 102 who has given the server system 104 permission (e.g., either expressly or implicitly through various privacy settings) to access the user's respective user data. In another example, data for one or more users of the social networking platform can be accessed by the server system 104 (FIG. 1) from the social networking platform 102 (FIG. 1) and be periodically cached by the server system 104 and stored in the demographic data and psychographic data 122 (FIG. 1). This cached data may be accessed instead of, or in addition to, accessing user data stored in the data store 112, as described above.

Using the accessed user data, one or more popularity scores can be generated (440). In one example, the server system 104 may compute a popularity score for a venue based on one or more identified affirmative actions of one or more users. As described above, these affirmative actions may include user generated endorsements, user generated check-ins, user generated posts, user generated tags, and other affirmative actions. In a particular example, when generating one or more popularity scores, these affirmative actions may be weighed based on characteristics of the users who performed the affirmative actions. In a particular example, affirmative actions of users on the social networking platform that are also users of the application may be weighted more heavily than users that are only users of the social networking platform. In some implementations, the one or more popularity scores may be calculated using a function similar to that shown in equation 2 below:

$$\text{Ln(popularity)} = (0.0528344343 * \text{Ln}(snAH)) + (0.9515309234 * \text{Ln}(segmentAH)) - (0.9330821651 * \text{Ln}(appAH)) + 9.330821651 * \text{Ln}(1 - 0.75*(appAH)^{-0.5}) \quad \text{(Eq. 2)}$$

In this example, snAH are a number of check-ins performed by all users of the social networking platform 102 that indicate that the users of the social networking platform 102 visited the particular venue. In some implementations, the value snAH can be identified in data made available by the social networking platform for a particular venue. Also in this example, segmentAH are check-ins performed on the social networking platform 102 and for the particular venue by users for whom the application is authorized to extract data from the social networking platform belonging to a crowd type that has been selected by the user of the application. Examples of the selected crowd type can include, but are not limited to, "Sports Lovers," "Single Men," and so forth. Also in this example, appAH are check-ins performed on the social networking platform 102 and for the particular venue by users for whom the application is authorized to extract data from the social networking platform 112 regardless of the crowd types to which the users belong. In an example, when no crowd type has been specified, the popularity score may be based solely on the number of check-ins performed by users of the social networking platform 102 that indicate that the users of the social networking platform 102 visited the particular venue. In some implementations, snAH, segmentAH, and appAH may reflect one or more other affirmative actions in addition to check-ins.

One or more popular venues can be determined (450). In an example, the popular venues may be determined based on the generated popularity scores for at least some of the venues located in the geographic region of interest. Generally, a popular venue includes a venue with an increased popularity score, e.g., relative to popularity scores associated with other venues. For example, the server system 104 may determine the twenty most popular venues based on the twenty highest popularity scores determined for the venues located in the geographic region of interest.

Data indicative of a type of user of the social networking platform can be generated (460). That is, for particular venues that are identified as popular venues, information can be determined about the types of users who frequent or otherwise interact with the venues (e.g., as indicated by the affirmative actions performed on the social networking platform). In an example, the server system 104 can aggregate relevant user data accessed for particular users of the social networking platform 102. In this example, if there are fifty particular users that have frequented or otherwise interacted with the particular venue, the server system 104 can aggregate the user data for all of those fifty particular users. More specifically, if twenty-five of those users are men and twenty-five of those users are women, the aggregated demographic data generated by the server system 104 would include an indication that fifty percent of users of the social networking platform that have frequented or otherwise interacted with the particular venue are men and fifty percent are women. In a particular example, as illustrated by user interface component 211 (FIG. 2B) fifty-five percent of users of the social networking platform that have frequented or otherwise interacted with the Velocity 5 venue are men.

This same percentage can also be shown in with additional demographic and psychographic data. For example, in response to selecting a particular venue (e.g., by selecting a selectable user interface component 211f (FIG. 2B)), additional user interfaces 230, 240, 250 and 260 may be presented. In particular, as shown in FIG. 2D, visual indication 242 may show a percentage of males and females that frequent or otherwise interact with the venue.

In an example, the data indicative of the type of user may include anonymous demographic data about one or more users of the social networking platform who perform the one or more affirmative actions for the determined popular venue and anonymous psychographic data about the one or more users of the social networking platform who perform the one or more affirmative actions for the determined popular venue. That is, there server system 104 may remove identifying information (e.g., name, contact information, and so forth) included in the user data when providing the demographic data and psychographic data to a user. For example, the income bracket information shown in visual representation 262 (FIG. 2G) does not include any particular information that would allow a user of the application to associate a particular income with a particular user of the social networking platform.

According to various examples, the generated data indicative of a type of user of the social networking platform that frequents or otherwise interacts with the one or more popular venues (e.g., the anonymous demographic data and the anonymous psychographic data) can be provided in various ways to show one or more characteristics of the types of users that frequent or otherwise interact with the one or more popular venues. In an example, the anonymous demographic data can include one or more of data indicative of a gender of the one or more users of the social networking platform who perform the one or more affirmative actions for the determined popular venue (e.g., as shown in the graphical user interface 230 in FIG. 2D). In another example, the anonymous demographic data can also include data indicative of an age of the one or more users of the social networking platform who perform the one or more affirmative actions for the determined popular venue (e.g., as shown in the graphical user interface 240 of FIG. 2E). In another example, the anonymous demographic data can also include data indicative of an ethnicity of the one or more users of the social networking platform who perform the one or more affirmative actions for the determined popular venue.

In another example, the anonymous demographic data can also include data indicative of knowledge of languages of the one or more users of the social networking platform who perform the one or more affirmative actions for the determined popular venue (e.g., as shown in the graphical user interface 260 of FIG. 2G). In another example, the anonymous demographic data can also include data indicative of home ownership of the one or more users of the social networking platform who perform the one or more affirmative actions for the determined popular venue. In another example, the anonymous demographic data can also include data indicative of an employment status of the one or more users of the social networking platform who perform the one or more affirmative actions for the determined popular venue. In another example, the anonymous demographic data can also include data indicative of a relationship status of the one or more users of the social networking platform who perform the one or more affirmative actions for the determined popular business (e.g., as shown in the graphical user interface 230 of FIG. 2D).

In another example, the anonymous psychographic data can include one or more of data indicative of one or more interests of the one or more users of the social networking platform who perform the one or more affirmative actions for the determined popular venue (e.g., as shown in the graphical user interface 250 of FIG. 2F). The anonymous psychographic data can also include data indicative of a lifestyle of the one or more users of the social networking platform who perform the one or more affirmative actions for the determined popular venue. Other examples of providing demographic data and the anonymous psychographic data to show one or more characteristics of the types of users that frequent or otherwise interact with the one or more popular venues are also possible.

In some implementations, however, the demographic data and psychographic data may not be anonymous. In an example, the information in the graphical user interfaces 200, 210, 220, 230, 240, 250, and 260 may be based on particular friends on the social networking platform 102 (FIG. 1) of a user viewing the information. In a particular example, the user viewing the information may have requested to see where the user's friends on the social networking platform that are associated with the movie lovers crowd type have frequented, are currently located (e.g., based on a recent check-in), and so forth. In this particular example, the graphical user interfaces 200 and 210 may present representations of the user's friends at or near particular venues and indications (e.g., their respective names) that allow the user to identify which of their friends are at or near the particular venues.

In some examples, the method 400 may also transmit, to a client device, information indicative of a geographic area that includes representations of the one or more popular venues. In a particular example, the server system 104 may transmit information to one of the computing devices 106a-106n that can be interpreted by an application executing on one of the computing device 106a-106n causing the application to present a graphical user interface similar to that of graphical user interface 200 shown in FIG. 2A. That is, information transmitted by the server system 104 and received by an application may cause the application to display a map or other geographical representation that includes representations of one or more popular venues. In a particular example, user interface 200 (FIG. 2A) may present push-pins or other representations for the determined popular venues.

In some examples, the method 400 may also receive information indicative of a selection of at least one of the representations included in the geographic area. In a particular example, if a user selects information indicative of one of the venues, the application may cause the one of the computing devices 106a-106n to provide an indication of the selection to the server system 104. In response, the method 400 may also transmit, to the client device, anonymous demographic data and anonymous psychographic data about one or more users associated with a venue represented by the selected representation. In an example, the server system 104 may retransmit the anonymous demographic data and anonymous psychographic data such that the anonymous demographic data and anonymous psychographic data is presented by the application. In a particular example, the application may present any of graphical user interfaces 210, 220, 230, 240, 250, and 260 shown in FIGS. 2B-2G to present the anonymous demographic data and anonymous psychographic data to the user of the application.

In some examples, the anonymous demographic data and anonymous psychographic data are indicative of users who frequent or otherwise interact with a popular venue. This anonymous data may be cached on the computing device 106. As a result, when a user selects a visual representation of the popular venue for which the anonymous data is cached, the application can access the cached data, without having to request that information from the server system 104.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
 receiving a request for information indicative of venues that are located within a geographic region of interest;
 in response to the received request, accessing user data for one or more users of a social networking platform, with the accessed user data being associated with the venues located within the geographic region of interest;
 for each particular venue among multiple venues located within the geographic region of interest, identifying, in the accessed user data, data indicative of one or more affirmative actions that are performed for the particular venue by at least one of the one or more users; and
 generating, based on the data indicative of the one or more affirmative actions associated with the particular venue, a popularity score for the particular venue, wherein the generated popularity score being indicative of an affinity of the one or more users for the particular venue;
 determining, based on the generated popularity scores for the multiple venues located within the geographic region of interest, popular venues, wherein a popular venue of the determined popular venues being associated with an increased popularity score relative to popularity scores of other of the multiple venues located with the geographic region of interest;

applying a crowd type filter to the determined popular venues, wherein the applied crowd type filter defining one or more user attributes selected by a user transmitting the request, wherein each of the one or more user selected attributes being venue independent;

based on the applied crowd type filter, determining at least one popular venue of the determined popular venues, wherein the determined at least one popular venue is associated with at least a threshold amount of activity by at least one user with characteristics satisfying the one or more user selected venue independent attributes; and for the determined at least one popular venue associated with at least the threshold amount of activity by the at least one user with characteristics satisfying the one or more user selected venue independent attributes and located within the geographic region of interest, generating data indicative of a type of user of the social networking platform who performs the one or more affirmative actions providing the generated data indicative of the type of user to the user transmitting the request.

2. The computer implemented method of claim 1, further comprising:

analyzing data indicative of characteristics of users of the social networking platform who perform the one or more affirmative actions;

wherein generating the data indicative of the type of user comprises:

generating, based on analyzing, the data indicative of the type of user of the social networking platform who performs the one or more affirmative actions for the determined at least one popular venue associated with at least the threshold amount of activity and located within the geographic region of interest.

3. The computer-implemented method of claim 1, wherein the data indicative of the type of user comprises one or more of:

anonymous demographic data about the one or more users of the social networking platform who perform the one or more affirmative actions for the determined at least one popular venue associated with at least the threshold amount of activity and located within the geographic region of interest; and anonymous psychographic data about the one or more users of the social networking platform who perform the one or more affirmative actions for the determined at least one popular venue associated with at least the threshold amount of activity and located within the geographic region of interest.

4. The computer-implemented method of claim 3, wherein the anonymous demographic data comprises one or more of:

data indicative of a gender of the one or more users of the social networking platform who perform the one or more affirmative actions;

data indicative of an age of the one or more users of the social networking platform who perform the one or more affirmative actions;

data indicative of an ethnicity of the one or more users of the social networking platform who perform the one or more affirmative actions;

data indicative of knowledge of languages of the one or more users of the social networking platform who perform the one or more affirmative actions;

data indicative of home ownership of the one or more users of the social networking platform who perform the one or more affirmative actions;

data indicative of an employment status of the one or more users of the social networking platform who perform the one or more affirmative actions; and data indicative of a relationship status of the one or more users of the social networking platform who perform the one or more affirmative actions; and wherein the anonymous psychographic data comprises one or more of:

data indicative of one or more interests of the one or more users of the social networking platform who perform the one or more affirmative actions; and data indicative of a lifestyle of the one or more users of the social networking platform who perform the one or more affirmative actions.

5. The computer-implemented method of claim 1, wherein the accessed user data includes:

demographic data and psychographic data for a particular user on the social networking platform; and demographic data and psychographic data for one or more other users of the social networking platform, with the one or more other users having one or more social connections to the particular user in the social networking platform.

6. The computer-implemented method of claim 5, further comprising:

determining one or more privacy settings that have been set by the particular user; and determining one or more privacy settings that have been set by respective ones of the one or more other users, wherein the accessed user data is based on the one or more privacy settings for the particular user and the privacy settings for the respective ones of the one or more other users.

7. The computer-implemented method of claim 1, wherein an affirmative action comprises one or more of:

an action of endorsing content available on the social networking platform;

an action of checking into a location, wherein an entity associated with the location also has content on the social networking platform that corresponds to the location;

an action of posting content on the social networking platform; and an action of adding a tag to content posted on the social networking platform.

8. The computer-implemented method of claim 1, further comprising:

receiving a selection of a filtering criteria; and filtering the popular venues based on the received filtering criteria.

9. The computer-implemented method of claim 8, wherein the filtering criteria corresponds to a type of location and for a particular venue among the multiple venues located within the geographic region of interest, and wherein the method further comprises:

determining when the particular venue satisfies the filtering criteria;

identifying, in the accessed user data and based on determining when the particular venue satisfies the filtering criteria, data indicative of one or more affirmative actions that are performed for the particular venue by at least one of the one or more users; and generating, based on the data indicative of the one or more affirmative actions associated with the particular venue, a popularity score for the particular venue, with the popularity score being indicative of an affinity of the one or more users for the particular venue.

10. The computer-implemented method of claim 8, further comprising:

receiving information indicative of a selection of one or more demographic and psychographic criteria;

generating a custom crowd type from the received information indicative of the selection of the one or more demographic and psychographic criteria; and using the generated custom crowd type as the received filtering criteria.

11. The computer-implemented method of claim 1, further comprising:

transmitting, to a client device, information indicative of a geographic area that includes representations of one or more of the popular venues;

receiving information indicative of a selection of at least one of the representations included in the geographic area; and transmitting, to the client device, anonymous demographic data and anonymous psychographic data about one or more users who performed affirmative actions with a venue represented by the selected at least one of the representations.

12. The computer-implemented method of claim 1, further comprising:

receiving information indicative of one or more user attributes that define a particular crowd type; and determining a portion of the accessed user data that is associated with users of the social networking platform who possess attributes corresponding to at least one of the one or more user attributes that define the particular crowd type;

wherein the popularity score is generated based on the determined portion of the accessed user data that is associated with users of the social networking platform who possess attributes corresponding to at least one of the one or user attributes that define the particular crowd type and is indicative of an affinity of the particular venue with the particular crowd type relative to an affinity of the particular venue with users of the social networking platform.

13. A system comprising:

one or more processing devices; and one or more machine-readable media configured to store instructions that are executable by the one or more processing devices to perform operations comprising:

receiving a request for information indicative of venues that are located within a geographic region of interest;

in response to the received request, accessing user data for one or more users of a social networking platform, with the accessed user data being associated with the venues located within the geographic region of interest;

for each particular venue among multiple venues located within the geographic region of interest, identifying, in the accessed user data, data indicative of one or more affirmative actions that are performed for the particular venue by at least one of the one or more users; and generating, based on the data indicative of the one or more affirmative actions associated with the particular venue, a popularity score for the particular venue, wherein the generated popularity score being indicative of an affinity of the one or more users for the particular venue;

determining, based on the generated popularity scores for the multiple venues located within the geographic region of interest, popular venues, wherein a popular venue of the determined popular venues being associated with an increased popularity score relative to popularity scores of other of the multiple venues located with the geographic region of interest;

applying a crowd type filter to the determined popular venues, wherein the applied crowd type filter defining one or more user attributes selected by a user transmitting the request, wherein each of the one or more user selected attributes being venue independent;

based on the applied crowd type filter, determining at least one popular venue of the determined popular venues, wherein the determined at least one popular venue is associated with at least a threshold amount of activity by at least one user with characteristics satisfying the one or more user selected venue independent attributes; and for the determined at least one popular venue associated with at least the threshold amount of activity by the at least one user with characteristics satisfying the one or more user selected venue independent attributes and located within the geographic region of interest, generating data indicative of a type of user of the social networking platform who performs the one or more affirmative actions providing the generated data indicative of the type of user to the user transmitting the request.

14. The system of claim 13, wherein the data indicative of the type of user comprises one or more of:

anonymous demographic data about the one or more users of the social networking platform who perform the one or more affirmative actions for the determined at least one popular venue associated with at least the threshold amount of activity and located within the geographic region of interest; and anonymous psychographic data about the one or more users of the social networking platform who perform the one or more affirmative actions for the determined at least one popular venue associated with at least the threshold amount of activity and located within the geographic region of interest.

15. The system of claim 13, wherein the one or more processing devices further perform the operations comprising:

receiving a selection of a filtering criteria; and filtering the popular venues based on the received filtering criteria.

16. The system of claim 15, wherein the filtering criteria corresponds to a type of location and for each particular venue among multiple venues located within the geographic region of interest, and wherein the operations further comprise:

determining when the particular venue satisfies the filtering criteria; and identifying, in the accessed user data and based on determining when the particular venue satisfies the filtering criteria, data indicative of one or more affirmative actions that are performed for the particular venue by at least one of the one or more users;

generating, based on the data indicative of the one or more affirmative actions associated with the particular venue, a popularity score for the particular venue, with the popularity score being indicative of an affinity of the one or more users for the particular venue.

17. The system of claim 15 wherein the one or more processing devices further perform the operations comprising:
receiving a selection of information indicative of one or more demographic and psychographic criteria;
generating a custom crowd type from the received criteria; and
using the generated custom crowd type as the received filtering criteria.

* * * * *